United States Patent
Tian

(10) Patent No.: US 11,572,164 B2
(45) Date of Patent: Feb. 7, 2023

(54) METHOD OF FLIGHT CONTROL IN A FIXED-WING DRONE

(71) Applicant: Shanghai Autoflight Co., Ltd., Shanghai (CN)

(72) Inventor: Yu Tian, Hong Kong (CN)

(73) Assignee: Shanghai Autoflight Co., Ltd., Shanghai (CN)

( * ) Notice: Subject to any disclaimer, the term of this patent is extended or adjusted under 35 U.S.C. 154(b) by 0 days.

(21) Appl. No.: 17/819,638

(22) Filed: Aug. 15, 2022

(65) Prior Publication Data

US 2022/0388645 A1     Dec. 8, 2022

Related U.S. Application Data

(60) Division of application No. 17/396,703, filed on Aug. 8, 2021, now Pat. No. 11,433,998, which is a continuation-in-part of application No. 16/281,020, filed on Feb. 20, 2019, now abandoned.

(30) Foreign Application Priority Data

Aug. 7, 2020     (CN) .......................... 202021631663.0
Oct. 29, 2020    (CN) .......................... 202022482011.1

(51) Int. Cl.
  *B64C 29/00*   (2006.01)
  *B64C 39/02*   (2023.01)
  *B64C 1/22*    (2006.01)

(52) U.S. Cl.
  CPC ............ *B64C 29/0025* (2013.01); *B64C 1/22* (2013.01); *B64C 29/0033* (2013.01); *B64C 39/024* (2013.01); *B64C 2201/021* (2013.01); *B64C 2201/104* (2013.01)

(58) Field of Classification Search
  CPC .................................................. B64C 29/0025
  See application file for complete search history.

(56) References Cited

U.S. PATENT DOCUMENTS

| | | | |
|---|---|---|---|
| 6,293,491 B1* | 9/2001 | Wobben | B64D 27/24 244/17.23 |
| 2006/0151666 A1* | 7/2006 | VanderMey | B64C 29/0016 244/12.3 |
| 2019/0127056 A1* | 5/2019 | Weekes | B64C 27/26 |
| 2021/0300527 A1* | 9/2021 | Thalheimer | B64C 29/0033 |

* cited by examiner

*Primary Examiner* — Nicholas McFall
(74) *Attorney, Agent, or Firm* — WPAT Law, P.C.; Anthony King

(57) ABSTRACT

The disclosure provides a method of controlling the yaw of a fixed-wing UAV, with two traction propellers arranged parallel to each other and providing thrust for the UAV; A plurality of motors configured to drive the two traction propellers, wherein the thrust ratio provided by the two traction propellers is changed to generate asymmetric thrust which controls the active yaw of the UAV. The fixed-wing UAV provided by the disclosure improves the reliability of the thrust system and active yaw.

6 Claims, 20 Drawing Sheets

130

105A 105B

104A

METHOD OF FLIGHT CONTROL IN A FIXED-WING DRONE

CROSS-REFERENCES

This application claims priority to, and is a divisional of, U.S. patent application Ser. No. 17/396,703, filed on Aug. 8, 2021, now allowed, which is a continuation-in-part application of U.S. patent application Ser. No. 16/281,020, filed on Feb. 20, 2019, now abandoned, both of which are hereby incorporated by reference in their entireties.

This application claims priority to, and is a divisional of, U.S. patent application Ser. No. 17/396,703, filed on Aug. 8, 2021, now allowed, which also claimed foreign priority to China Pat. Application No. 202021631663.0, filed on Aug. 7, 2020 and China Pat. Application No. 202022482011.1, filed on Oct. 29, 2020, all of which are hereby incorporated by reference in their entireties.

Although incorporated by reference in its entirety, no arguments or disclaimers made in the related application apply to this application. Any disclaimer that may have and occurred or might occur during the prosecution of the above-referenced application is hereby expressly rescinded.

FIELD OF THE DISCLOSURE

The Disclosure relates to UAV technology, in particular to a fixed wing UAV.

BACKGROUND OF THE INVENTION

The layout of existing vertical takeoff and landing (VTOL) fixed wing UAV is mostly push back single thrust design. In this layout form, the thrust is limited, and the thrust system has low reliability. In addition, the heading control mode of existing VTOL UAV is to control the steering of UAV through rudder or aileron. If the rudder or aileron fails, the reliability of UAV will be low. The thrust motors of existing VTOL UAVs are mostly installed at the rear of the longitudinal axis of the fuselage, which is very inconvenient for the layout of UAV with limited fuselage space.

SUMMARY OF THE INVENTION

The Disclosure relates to a fixed wing UAV, which is used to solve the problem of low reliability of UAV thrust system and active yaw in the prior art.

The Disclosure provides a fixed wing UAV, comprising:

Propellers arranged on both sides of the fixed wing UAV in parallel and providing thrust for the fixed wing UAV, and the propellers arranged on both sides of the fixed wing UAV can rotate at different rotation speeds to realize the active yaw of the UAV.

In an embodiment of the Disclosure, the disclosure also comprises a main body, a main wing, a front wing, and a linear support. The main wing comprises a left main wing and a right main wing, and the left main wing and the right main wing are positioned on the opposite sides of the main body, respectively. The front wing is positioned at the front side of the main wing. The front wing comprises a left front wing and a right front wing. The left front wing and the right front wing are engaged with the main body and are positioned on the opposite sides of the main body, respectively. The linear support comprises a left linear support and a right linear support. The longitudinal axes of the left linear support, the right linear support and the main body are arranged parallel to each other. The left linear support is engaged with the left main wing, and the right linear support is engaged with the right main wing;

The propellers are arranged at the front ends of the left linear support and the right linear support, respectively; and/or, the propellers are arranged at the rear ends of the left linear support and the right linear support, respectively.

In an embodiment of the disclosure, the rotation axis of the propeller is parallel to the axis of the linear support.

In an embodiment of the disclosure, it also includes a motor and a microprocessor, the body of the motor is positioned inside the linear support and fixedly connected with the linear support, and the propeller is fixedly connected with the output shaft of the motor. The microprocessor is connected with the motor in communication and is used to control the rotation speed of the motor output shaft so that the rotation speeds of the two propellers are different.

In an embodiment of the disclosure, it also includes a rudder, which is used to control the active yaw of the fixed wing UAV.

In an embodiment of the disclosure, the fixed wing UAV only realizes the active yaw of the UAV through the different rotation speeds of the propellers on both sides of the fixed wing UAV.

The disclosure also provides a fixed wing UAV, comprising:

Two propulsion propellers arranged parallel to each other on the UAV and providing thrust for the UAV, or two traction propellers arranged parallel to each other and providing thrust for the UAV;

A plurality of motors configured to drive the two propulsion propellers or the two traction propellers, respectively, Wherein the thrust ratio provided by the two propulsion propellers, or the thrust ratio provided by the two traction propellers is changed to generate asymmetric thrust, which controls the active yaw of the UAV.

In an embodiment of the disclosure, the UAV also includes a rudder. When the rudder fails, the microprocessor can directly change the thrust ratio to compensate the rudder.

In an embodiment of the disclosure, the UAV also includes a plurality of lift propellers, which are configured to provide the UAV with vertical take-off and landing function.

In an embodiment of the disclosure, the UAV also comprises a left main wing and a right main wing, as well as a left front wing and a right front wing, wherein the left front wing and the right front wing are arranged in front of the left main wing and the right main wing, respectively.

In an embodiment of the disclosure, the UAV also includes a left linear support and a right linear support, wherein the left linear support and the right linear support are arranged parallel to each other, the left linear support connects the left main wing with the left front wing, and the right linear support connects the right main wing with the right front wing.

In an embodiment of the disclosure, the UAV also includes a detachable cargo hold or passenger cabin attached to its bottom side.

In an embodiment of the disclosure, the two propulsion propellers are arranged at the rear end of each of the left linear support and the right linear support, respectively.

In an embodiment of the disclosure, the two propulsion propellers are configured to provide thrust for the UAV.

In an embodiment of the disclosure, the two traction propellers are configured to provide thrust for the UAV.

In an embodiment of the disclosure, the UAV is not provided with a rudder, and the UAV is a fixed wing UAV with vertical takeoff and landing function.

In an embodiment of the disclosure, the UAV does not have any control interface.

In an embodiment of the disclosure, the UAV also includes a left linear support and a right linear support, the left linear support connects the left main wing with the left front wing, and the right linear support connects the right main wing with the right front wing.

In an embodiment of the disclosure, the UAV also includes a detachable cargo hold or passenger cabin attached to its bottom side.

In an embodiment of the disclosure, the two propulsion propellers are configured to provide thrust for the UAV.

In an embodiment of the disclosure, the two traction propellers are configured to provide thrust for the UAV.

In an embodiment of the disclosure, the two propulsion propellers are arranged at the rear end of each of the left linear support and the right linear support, respectively.

The disclosure provides a fixed wing UAV, which comprises propellers arranged parallel to each other on both sides of the fixed wing UAV and providing thrust for the fixed wing UAV, and the propellers on both sides of the fixed wing UAV can rotate at different rotation speeds to realize the active yaw of the UAV. The fixed wing UAV provided by the disclosure drives the UAV to fly forward through the rotation of two propellers arranged parallel to each other on the fixed wing UAV to provide thrust for the fixed wing UAV. The two propellers may rotate at different rotation speeds, so that when the rudder fails, the two propellers can rotate at different rotation speeds to lead to different thrusts on both sides of the UAV and realize the active yaw of the UAV. Therefore, the fixed wing UAV provided by the disclosure improves the reliability of UAV thrust system and UAV active yaw.

Although the specifications contain many details of specific implementations, they should not be interpreted as limitations on any disclosure or the scope of protection that can be claimed, but as a description of the characteristics of specific implementations for specific embodiments. Some characteristics described in the context of different implementations in the specifications may also be combined in separate implementations. On the contrary, various characteristics described in the context of separate implementations may also be implemented in multiple implementations alone or in any suitable sub-combination. Further, although characteristics may be described as functioning in certain combinations and even initially in the context, in some cases, one or more characteristics from the described/claimed combination may be removed from the combination, and the described/claimed combination may be a sub-combination or a change to the sub-combination.

Many implementations have been described. However, it should be understood that various modifications may be made without departing from the spirit and scope of the disclosure. For example, the example operations, methods, or processes described herein may include more or less steps than those described. In addition, the steps in these example operations, methods, or processes may be performed in a different manner than those described or shown in the drawings.

Details of one or more implementations of the subject matter described in the disclosure are described in the drawings and the following description. Other characteristics, aspects and advantages of the subject matter will become apparent according to the specifications, drawings, and technical solution.

BRIEF DESCRIPTION OF DRAWINGS

It should be noted that the drawings may be in a simplified form and may not be shown in an accurate scale. With reference to the disclosure herein, for convenience and clarity only, and with reference to the drawings, directional terms such as top, bottom, left, right, up, down, upward, above, downward, below, rear, front, distal and proximal are used. These directional terms should not be interpreted as limiting the scope of the embodiments in any way.

FIG. 1b is a schematic diagram showing the yaw of the UAV system shown in FIG. 1a;

Figure 1A:
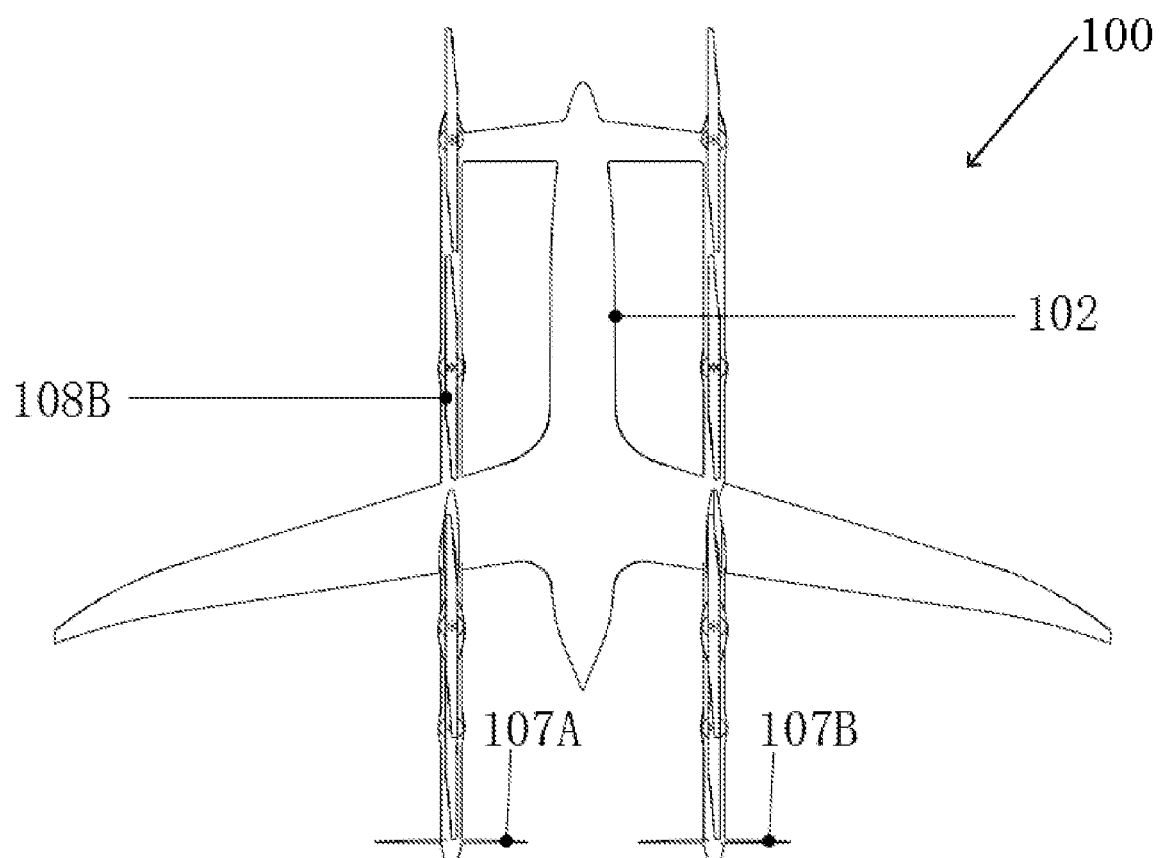
FIG. 1a is a top view of an embodiment of a UAV system according to one aspect of the embodiment.

When referring to the elements of the reference signs, the following list of elements appearing in the drawings can be a useful guide:

100—UAV; 101—Flight platform; 102—Main body; 103A—Left linear support; 103B—Right linear support; 104A—Left main wing; 104B—Right main wing; 105A—Left front wing; 105B—Right front wing; 106A—Left vertical stabilizer; 106B—Right vertical stabilizer; 107—Propulsion propeller; 107A—Left propulsion propeller; 107B—Right propulsion propeller; 108A—First lift propeller; 108B—Second lift propeller; 108C—Third lift propeller; 108D—Fourth lift propeller; 108E—Fifth lift propeller; 108F—Sixth lift propeller; 109A—Left wingtip propeller; 109B—Right wingtip propeller; 110A—Left wingtip vertical stabilizer; 110B—Right wingtip vertical stabilizer; 111A—Left folding leg; 111B—Right folding leg; 112A—First spring blade; 112B—Second spring blade; 112C—Third spring blade; 112D—Fourth spring blade; 116—Vertical extender; 117—Center propulsion propeller; 130—Cargo hold; 135A—First cabin spring blade; 135B—Second cabin spring blade; 135C—Third cabin spring blade; 135D—Fourth cabin spring blade; 140—Passenger cabin; 145A—Cabin leg; 145B—Cabin leg; 145C—Cabin leg; 145D—Cabin leg; 147—Cabin attachment latch; 148—Electric wheel; 149—Housing; 150—Energy storage unit in flight platform; 155—In-cabin energy storage unit; 160—Floating device; 170A—Traction propeller; 170B—Traction propeller; 180—Aileron; A—UAV heading.

DETAILED DESCRIPTION

Now, by turning to the detailed description of the following embodiments, we may better understand different aspects of various embodiments, which are presented as illustrative examples of the embodiments defined in the technical solution. It is clearly understood that the embodiments defined by the technical solution may be wider than the illustrated embodiments described below.

The terms used to describe various embodiments in the specifications shall be understood as not only having the meaning of their common definitions, but also including special definitions in the structure, material or behavior in the specifications that are beyond the meaning of the usual definitions. Therefore, if an element can be understood to include more than one meaning in the context of the specifications, its use in the technical solution must be understood to be common to all possible meanings supported by the specification and the word itself.

The term "UAV" is defined as a flight transportation system with at least one propeller as a propulsion source. The term "UAV" may include "manned" and "unmanned" flight transport systems. Manned UAV may refer to a flight transportation system, which carries human passengers who have no control over UAV. Manned UAV may also refer to a flight transportation system that carries human passengers, some or one of which have or has some control over the UAV.

For example, in the background of the disclosure, most of the existing VTOL fixed wing UAVs adopt push back single thrust design, and the reliability of the thrust system is low. In addition, the heading control mode of the existing VTOL UAV is to control the steering of the UAV through the rudder or aileron. When the rudder or aileron fails, the reliability of the UAV will be low. In order to solve the problem of low reliability of UAV thrust system and active yaw in the prior art, the disclosure provides a fixed wing UAV, which comprises propellers arranged parallel to each other on both sides of the fixed wing UAV and providing thrust for the fixed wing UAV, and the propellers on both sides of the fixed wing UAV can rotate at different rotation speeds to realize the active yaw of the UAV. The active yaw of the UAV is realized by using the different rotation speeds of the propellers on both sides of the UAV and the different thrust provided by the propellers on both sides.

The technical solution of the disclosure is described in detail below in combination with the specific drawings.

Figure 1B:
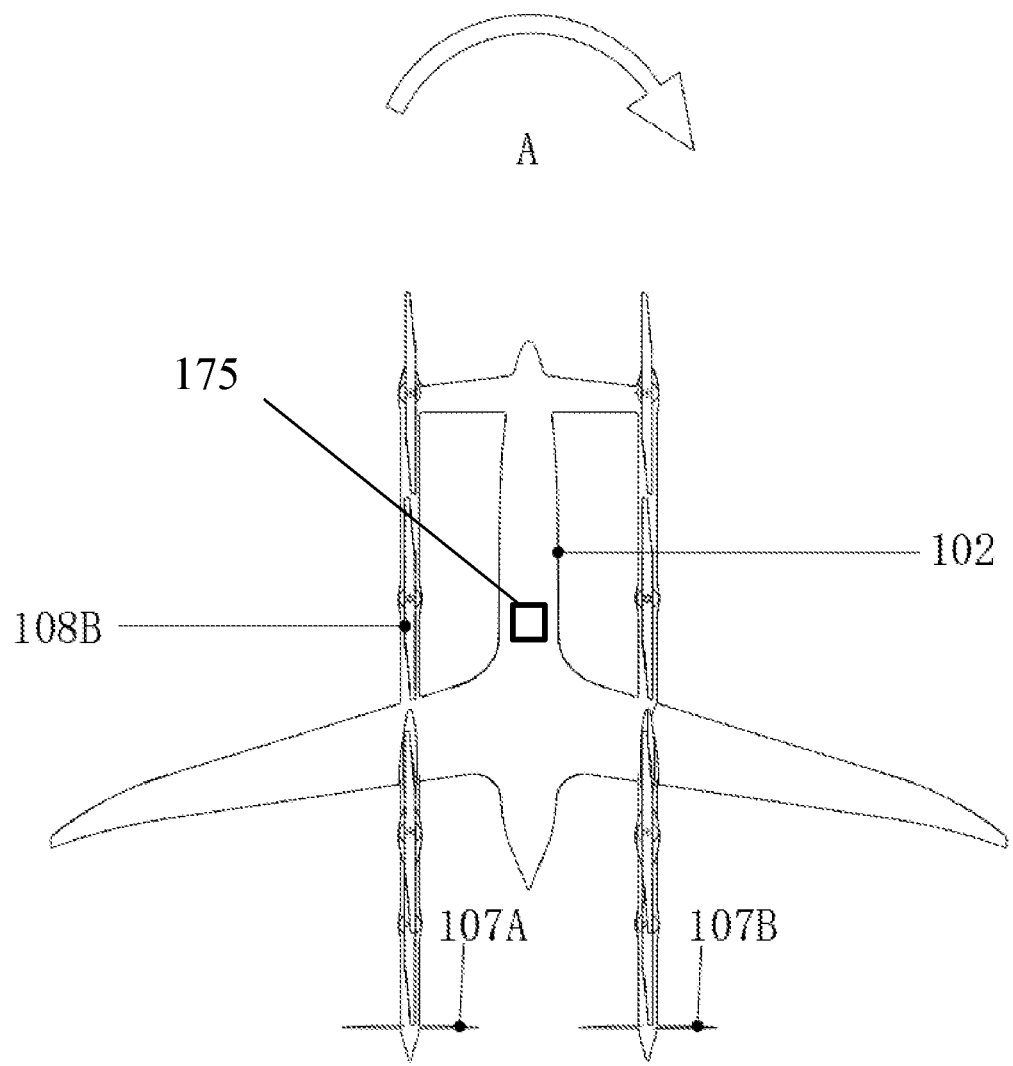
Figure 1C:
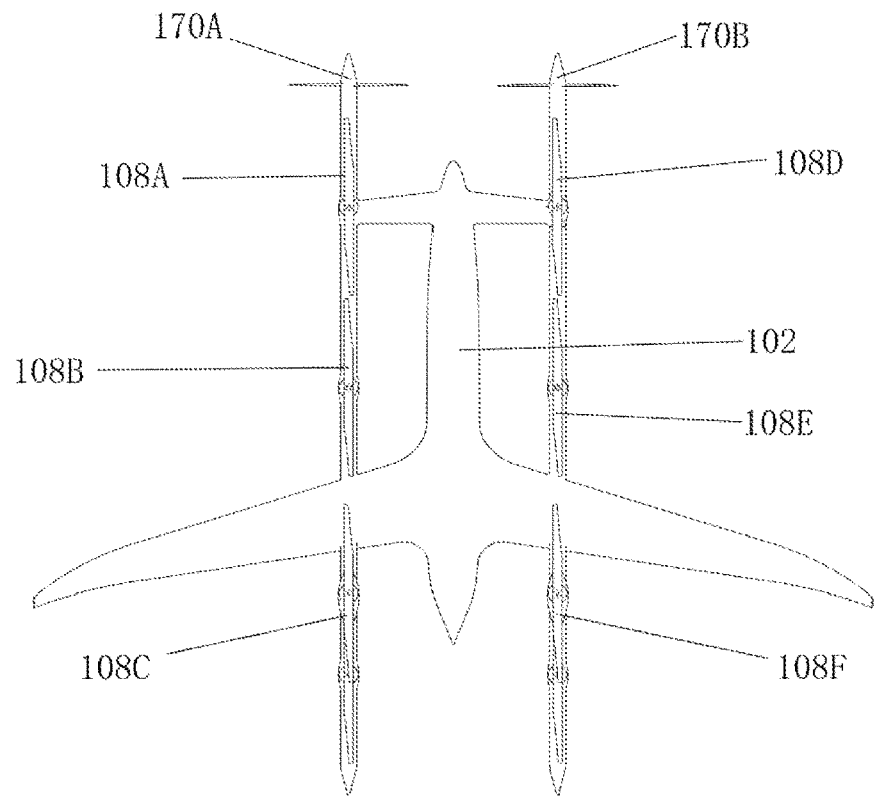
FIG. 1c is a top view of an embodiment of a UAV system according to another aspect of the embodiment.
Figure 1D:
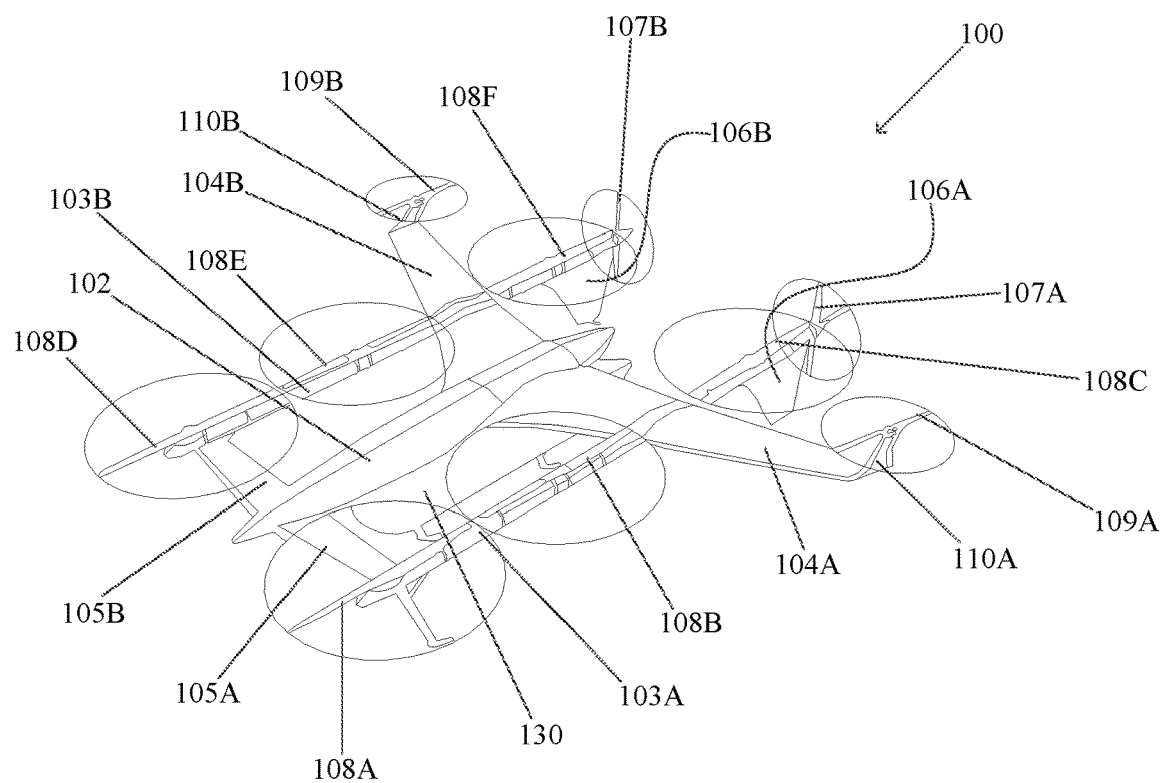
FIG. 1d is a top perspective view of an embodiment of a UAV system according to another aspect of the embodiment.
Figure 2:
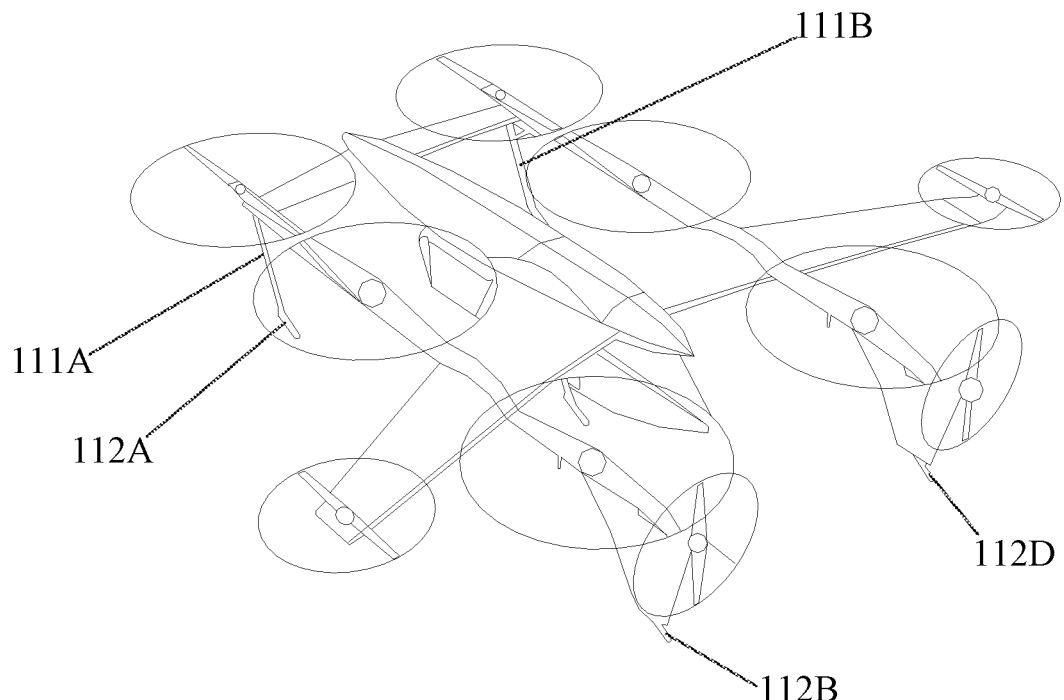
FIG. 2 is a top rear perspective view of the UAV system of FIG. 1d.
Figure 3:
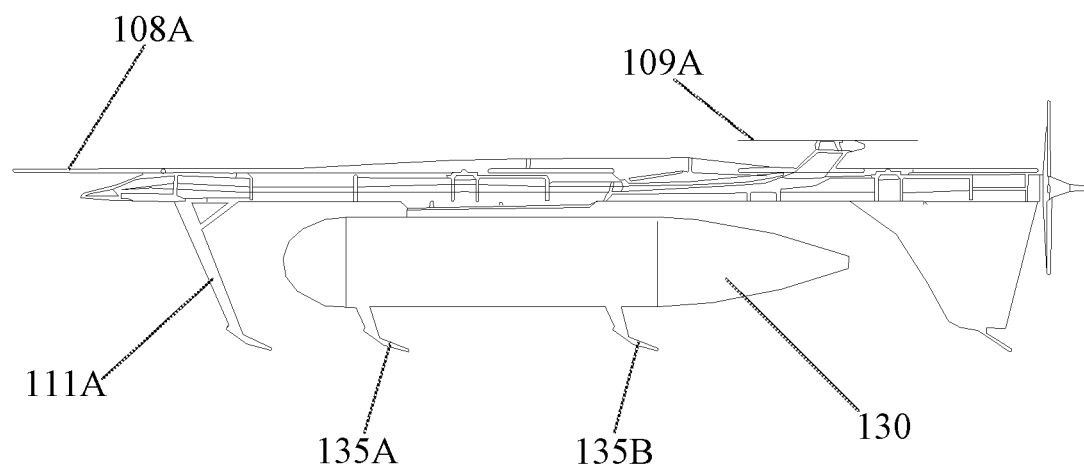
FIG. 3 is a side view of the UAV system of FIG. 1d.
Figure 4:
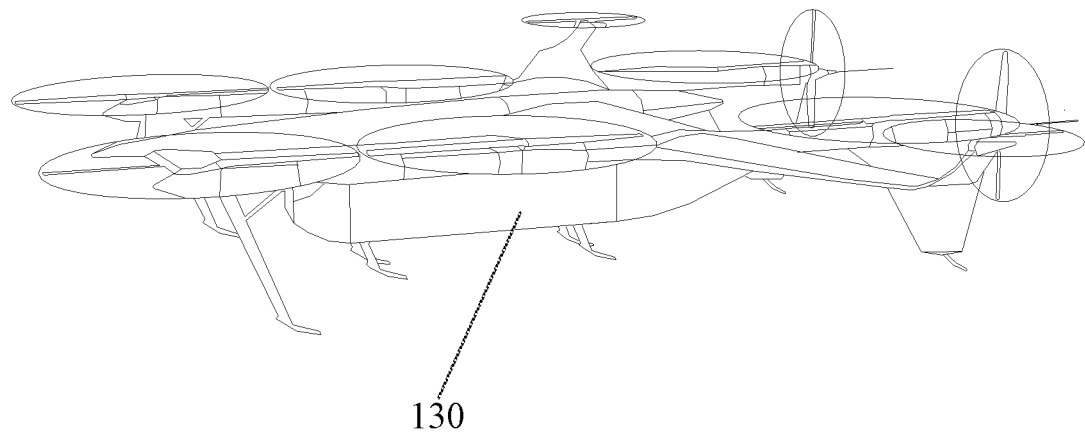
FIG. 4 is a top perspective view of another embodiment of a VTOL UAV system with a flight platform and a detachable attached cabin according to one aspect of the embodiment.
Figure 5:
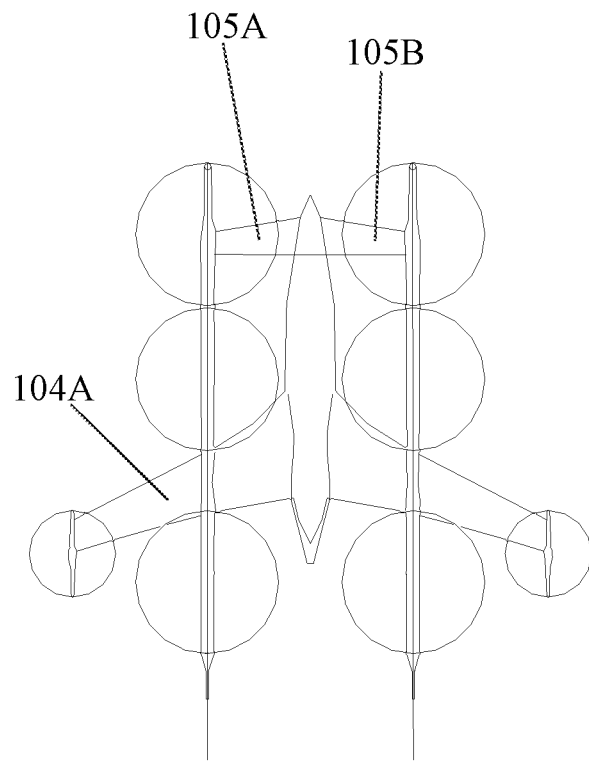
FIG. 5 is a top view of the UAV system of FIG. 4 according to one aspect of the embodiment.
Figure 6:
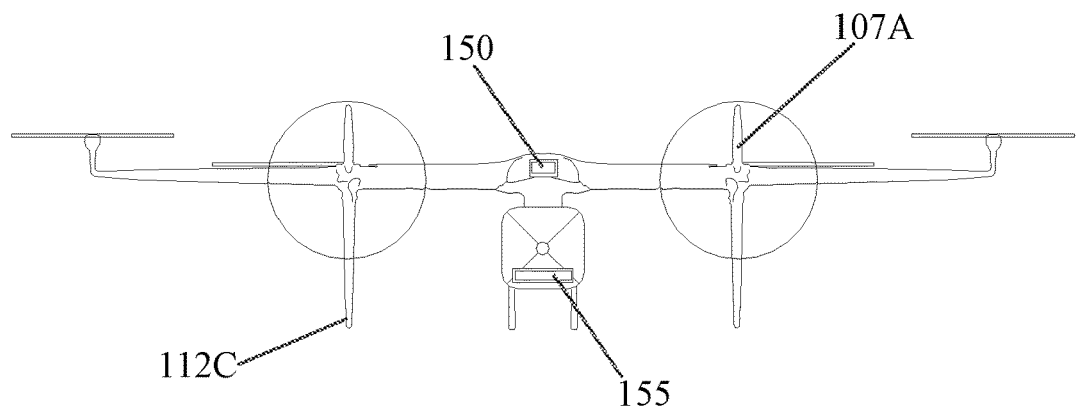
FIG. 6 is a front view of the UAV system of FIG. 4 according to one aspect of the embodiment.
Figure 7:
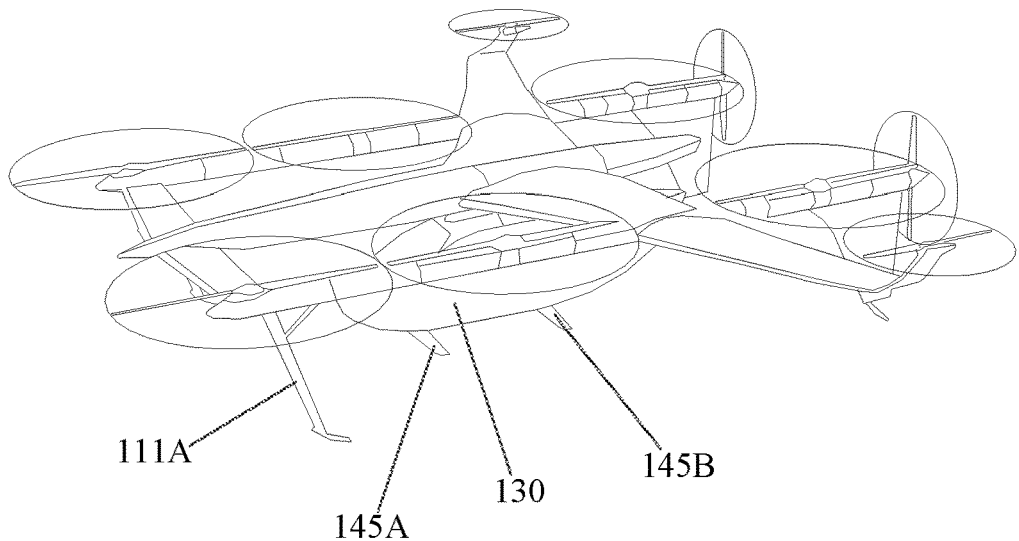
FIG. 7 is a top perspective view of an embodiment of a VTOL UAV system with a flight platform and a detachable attached passenger cabin according to one aspect of the embodiment.
Figure 8:
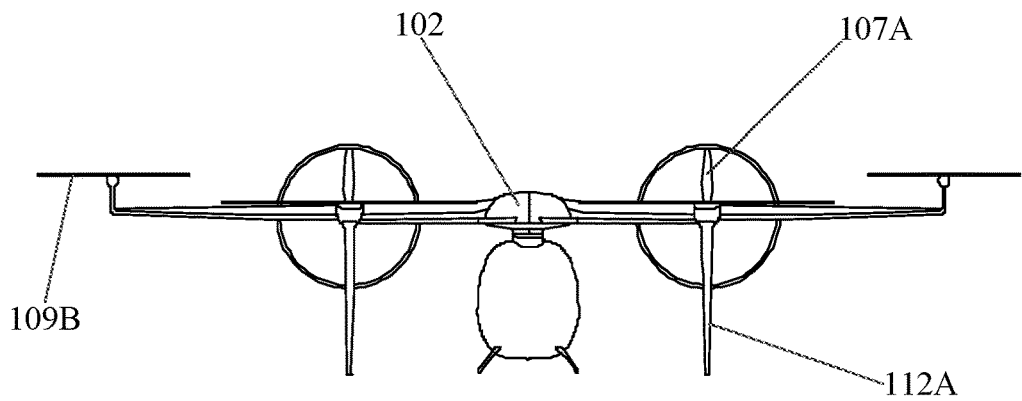
FIG. 8 is a front view of the UAV system of FIG. 7 according to one aspect of the embodiment.
Figure 9:
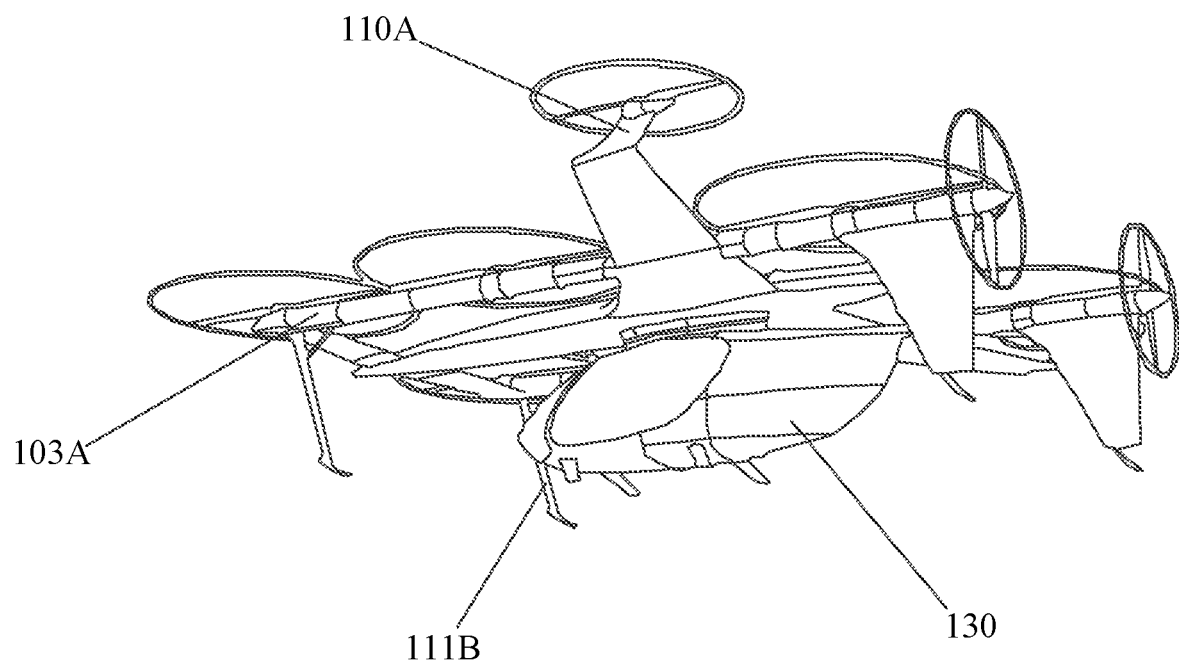
FIG. 9 is a rear perspective view of the UAV system of FIG. 7 according to one aspect of the embodiment.
Figure 10:
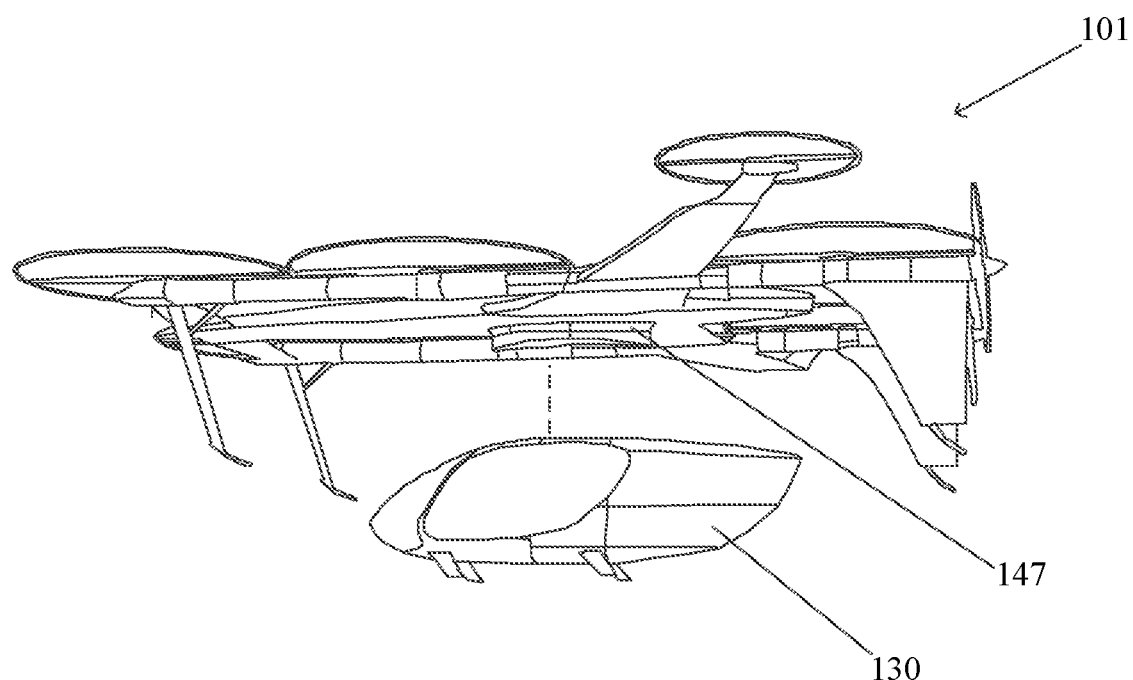
FIG. 10 is a side perspective view of the UAV system of FIG. 7 according to one aspect of the embodiment, wherein the passenger cabin is separated from the flight platform and parked on the ground.
Figure 11:
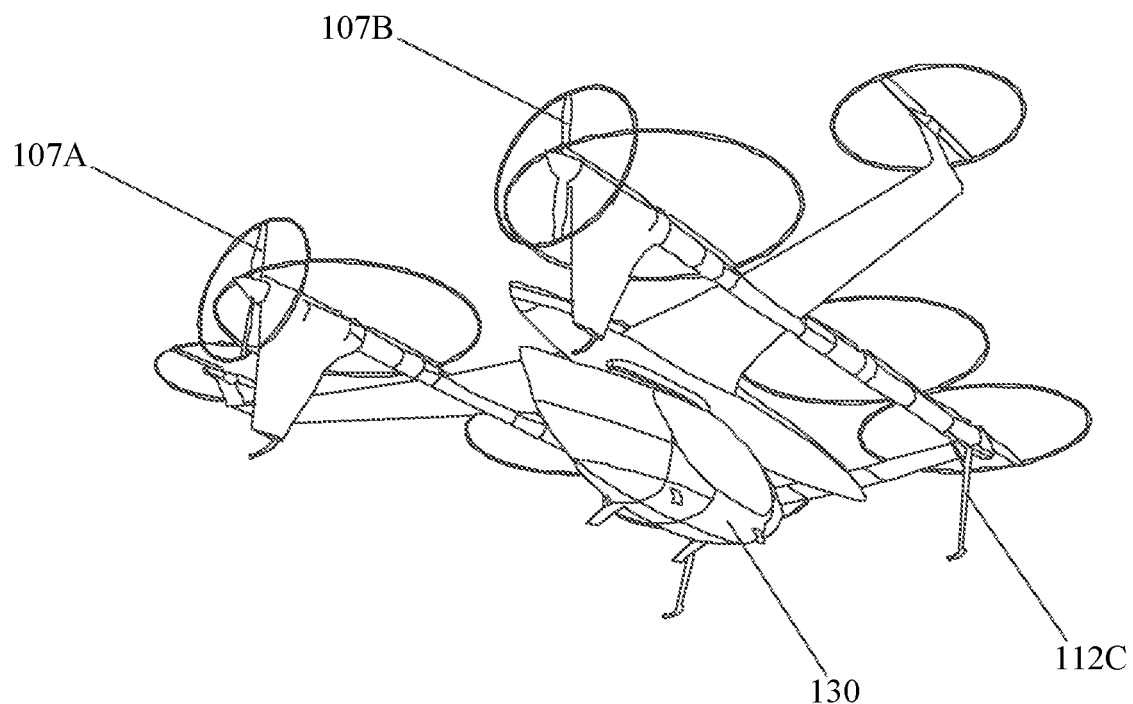
FIG. 11 is a rear perspective view of the embodiment of FIG. 7 according to one aspect of the embodiment.
Figure 12:
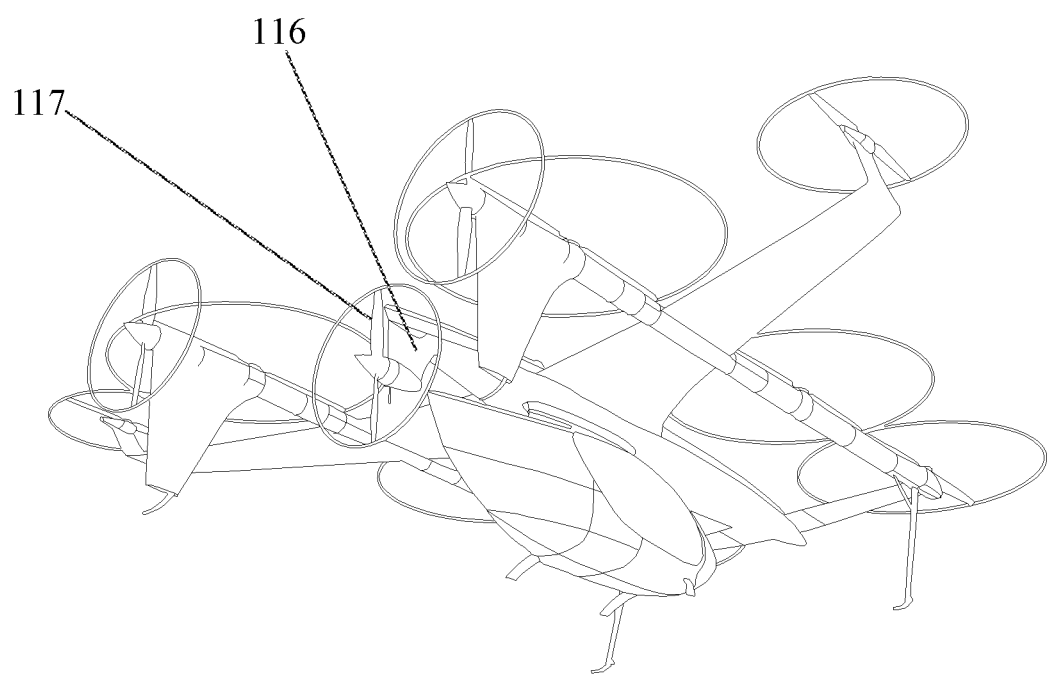
FIG. 12 is a rear perspective view of another embodiment according to one aspect of the disclosure.
Figure 13:
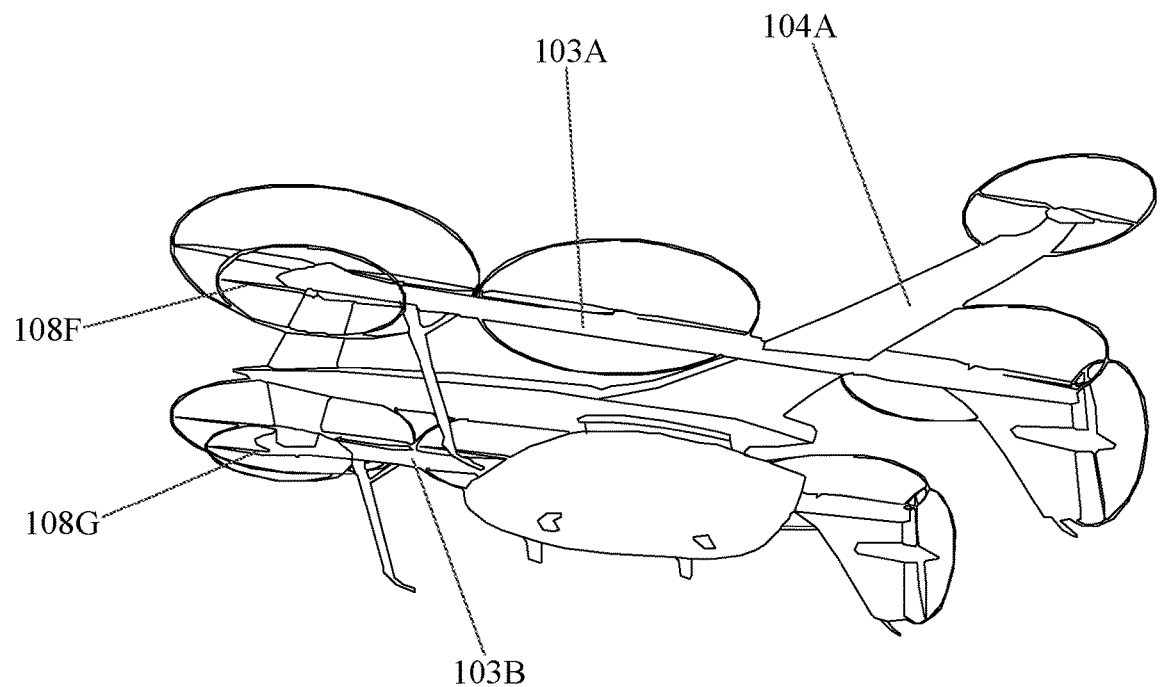
FIG. 13 is a side bottom perspective view of another embodiment of a UAV system according to one aspect of the embodiment.
Figure 14:
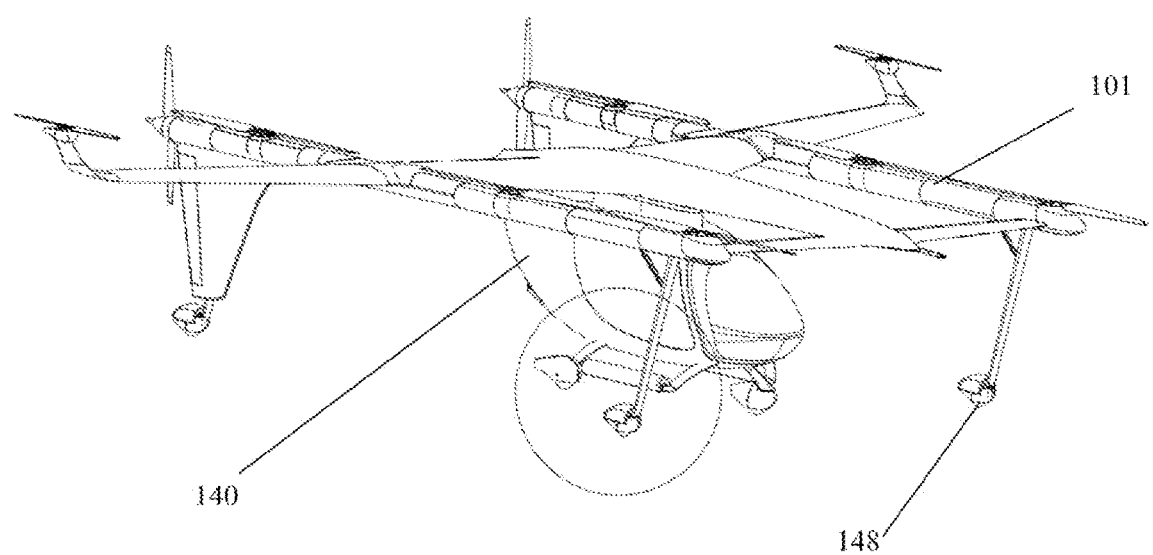
FIG. 14 is a perspective view of an embodiment of a UAV system according to another aspect of the embodiment.
Figure 15:
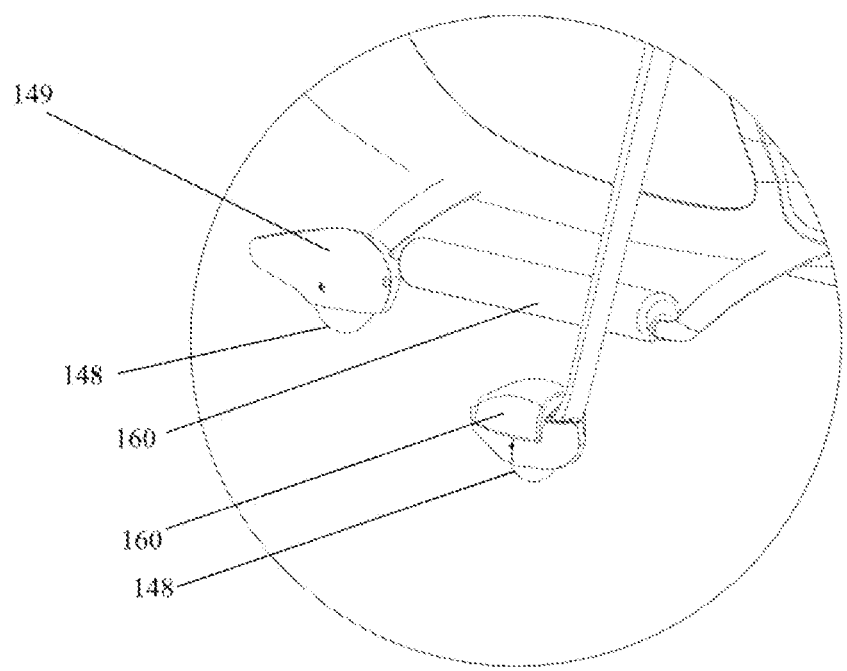
FIG. 15 is a close-up view of the surrounding area in FIG. 14 according to another aspect of the embodiment.
Figure 16:
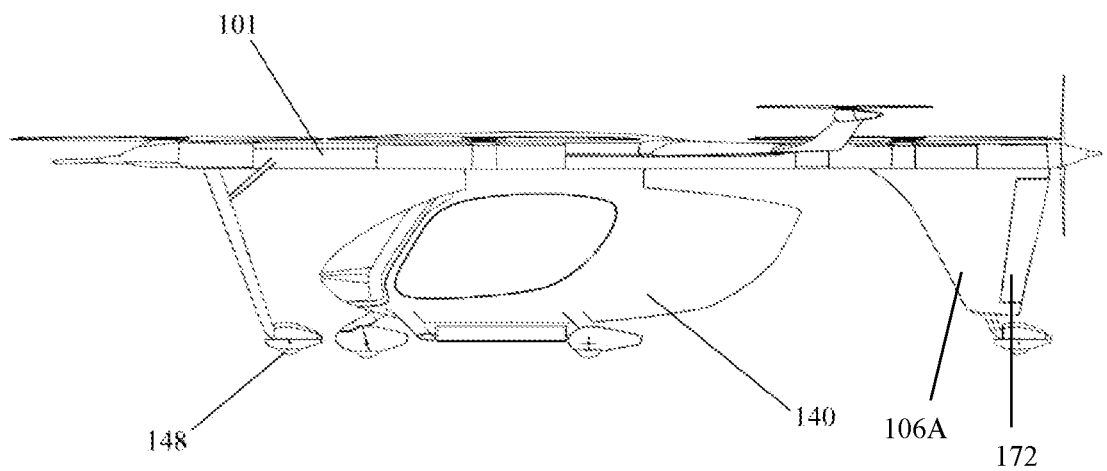
FIG. 16 is a side view of one embodiment of a UAV system according to another aspect of the embodiment.
Figure 17:
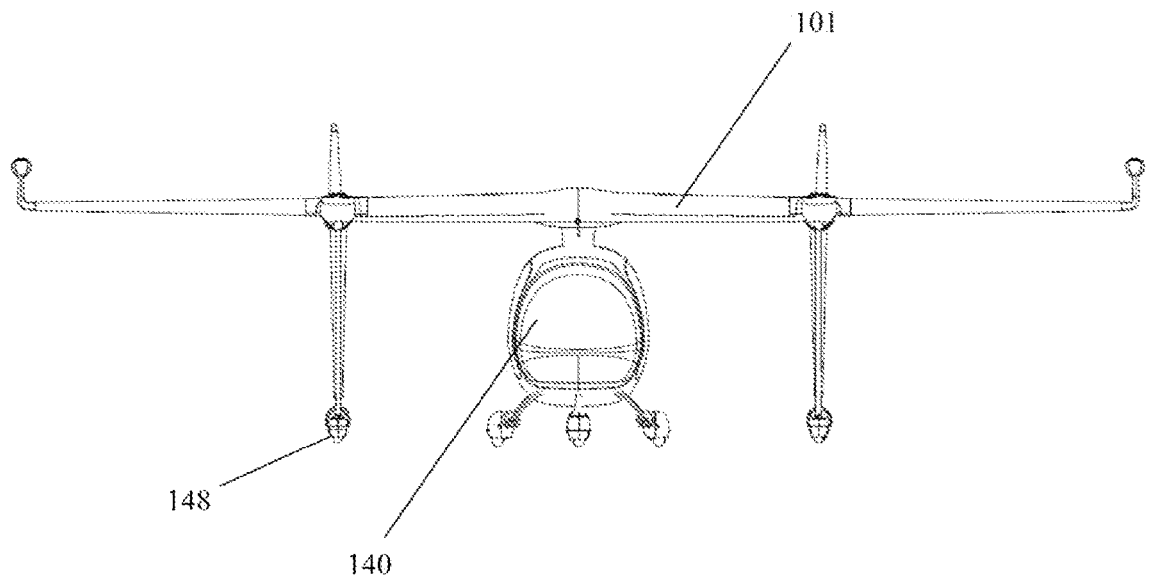
FIG. 17 is a front view of one embodiment of a UAV system according to another aspect of the embodiment.
Figure 18:
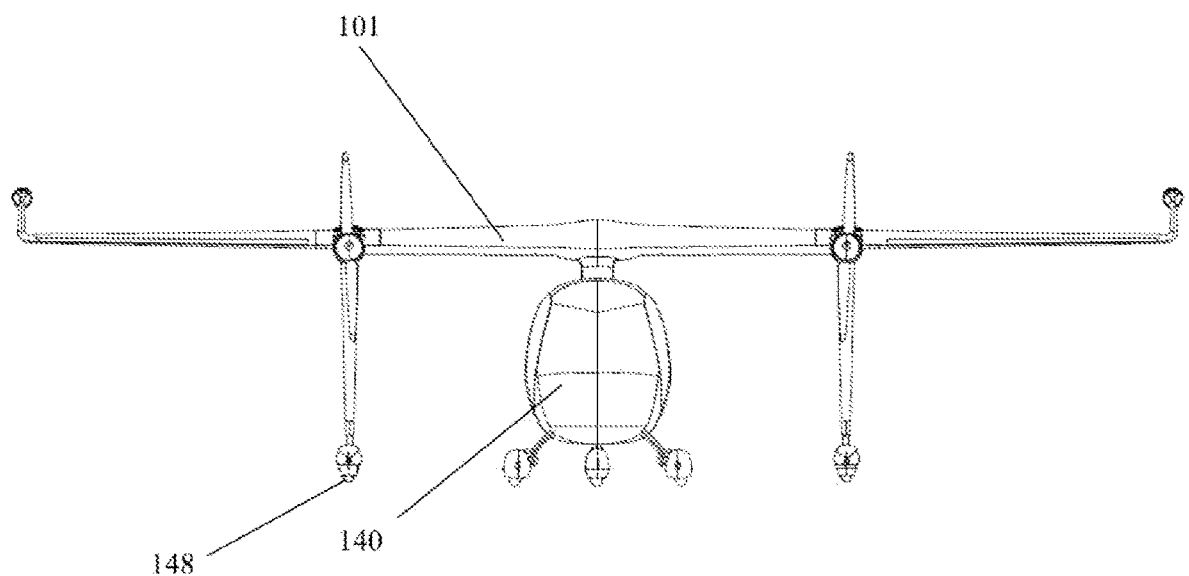
FIG. 18 is a rear view of one embodiment of a UAV system according to another aspect of the embodiment.
Figure 19:
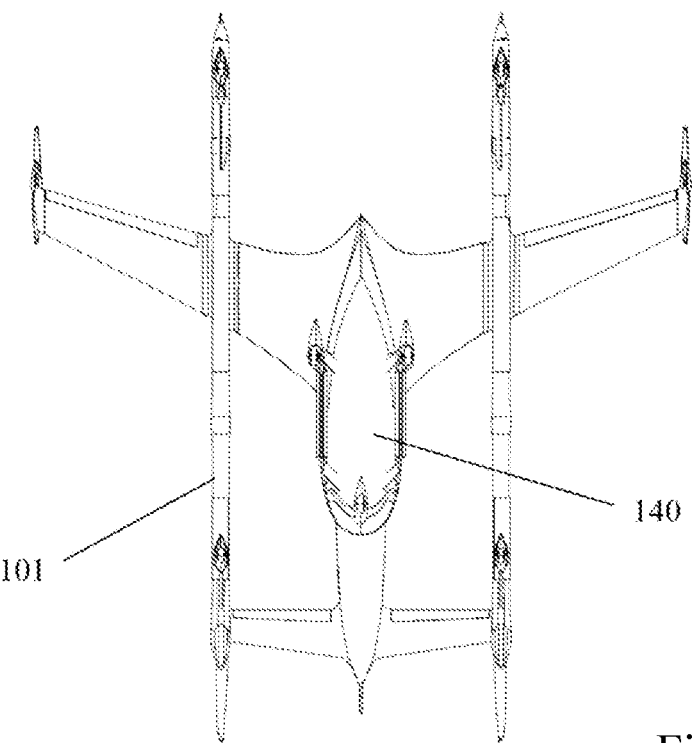
FIG. 19 is a bottom view of one embodiment of a UAV system according to another aspect of the embodiment.
Figure 20:
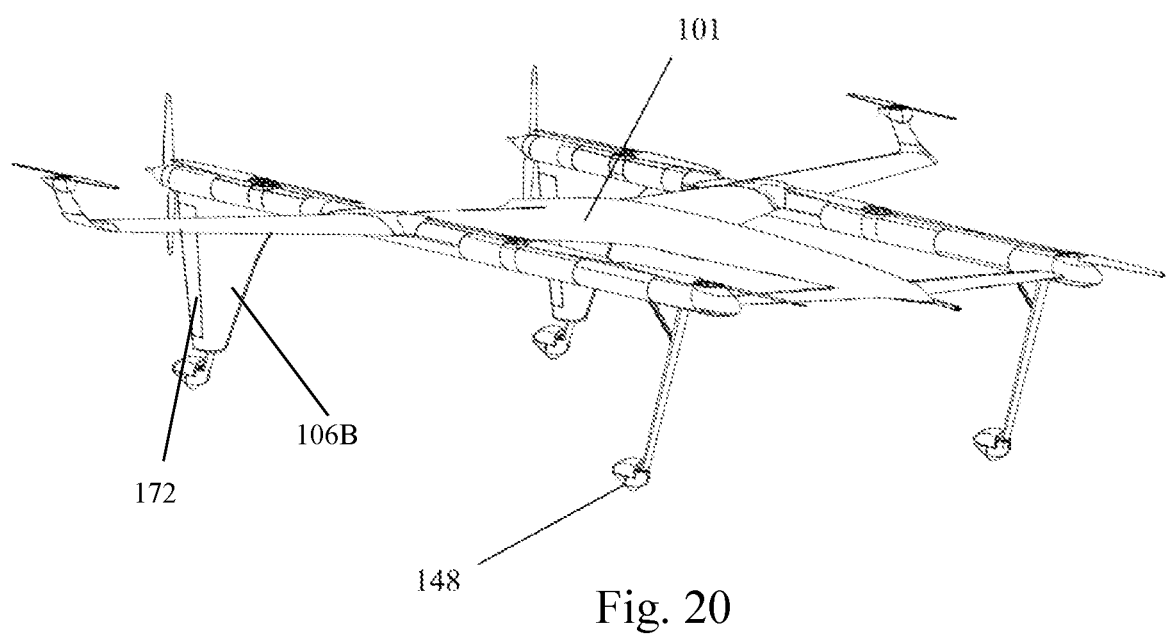
FIG. 20 is a perspective view of another embodiment of a flight platform according to another aspect of the embodiment.
Figure 21:
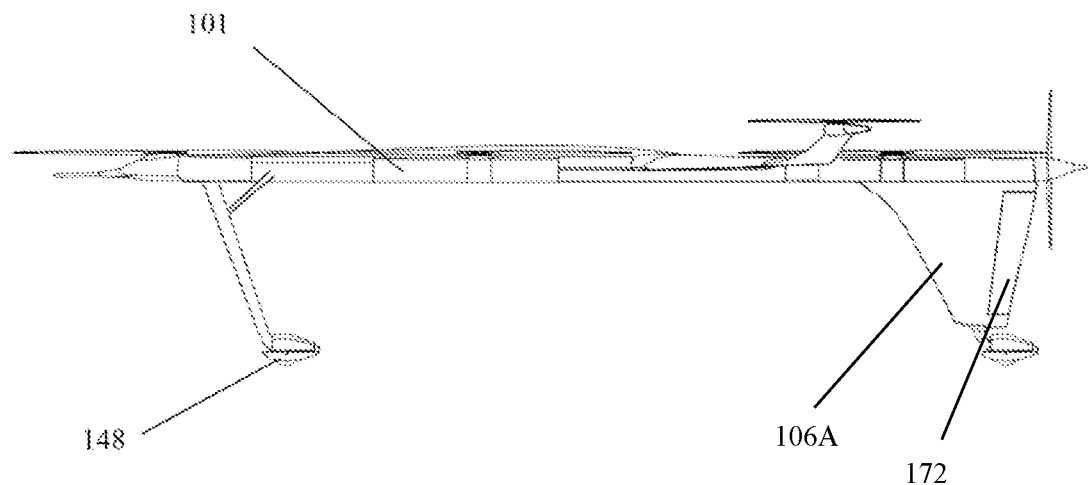
FIG. 21 is a side view of another embodiment of a flight platform according to another aspect of the embodiment.
Figure 22:
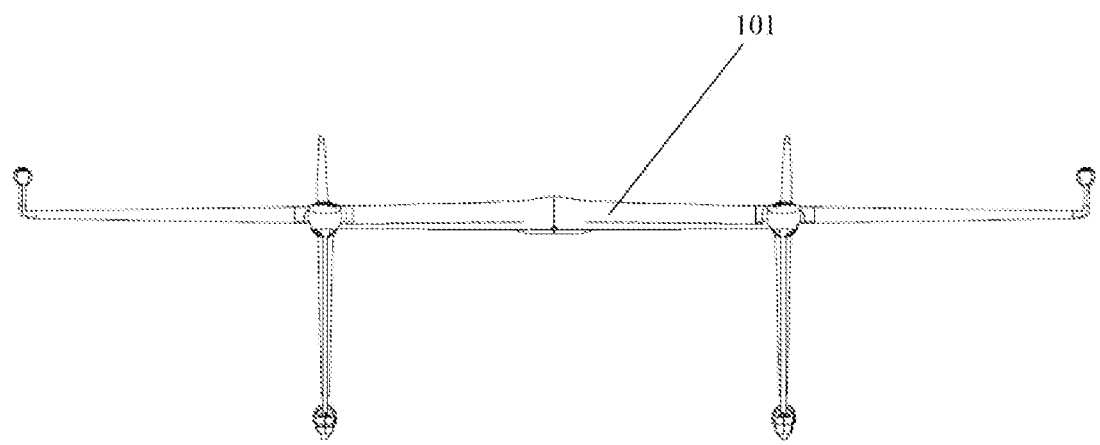
FIG. 22 is a front view of another embodiment of a flight platform according to another aspect of the embodiment.
Figure 23:
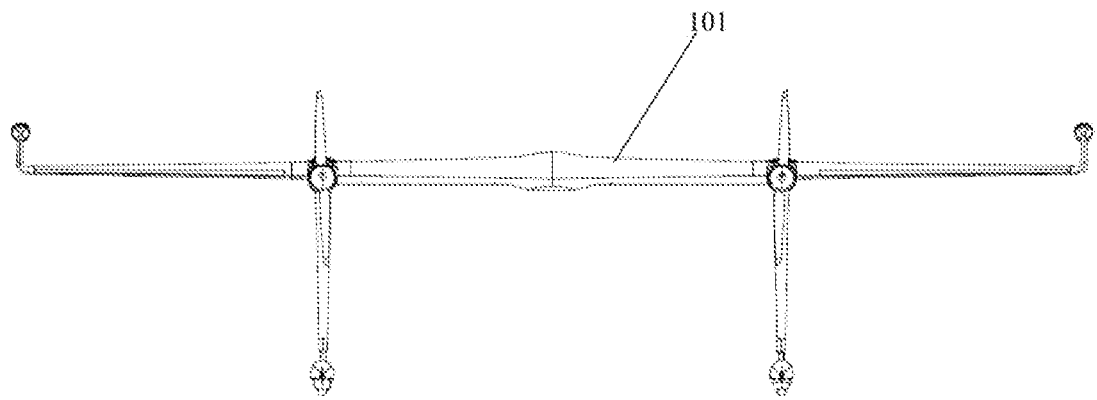
FIG. 23 is a rear view of another embodiment of a flight platform according to another aspect of the embodiment.
Figure 24:
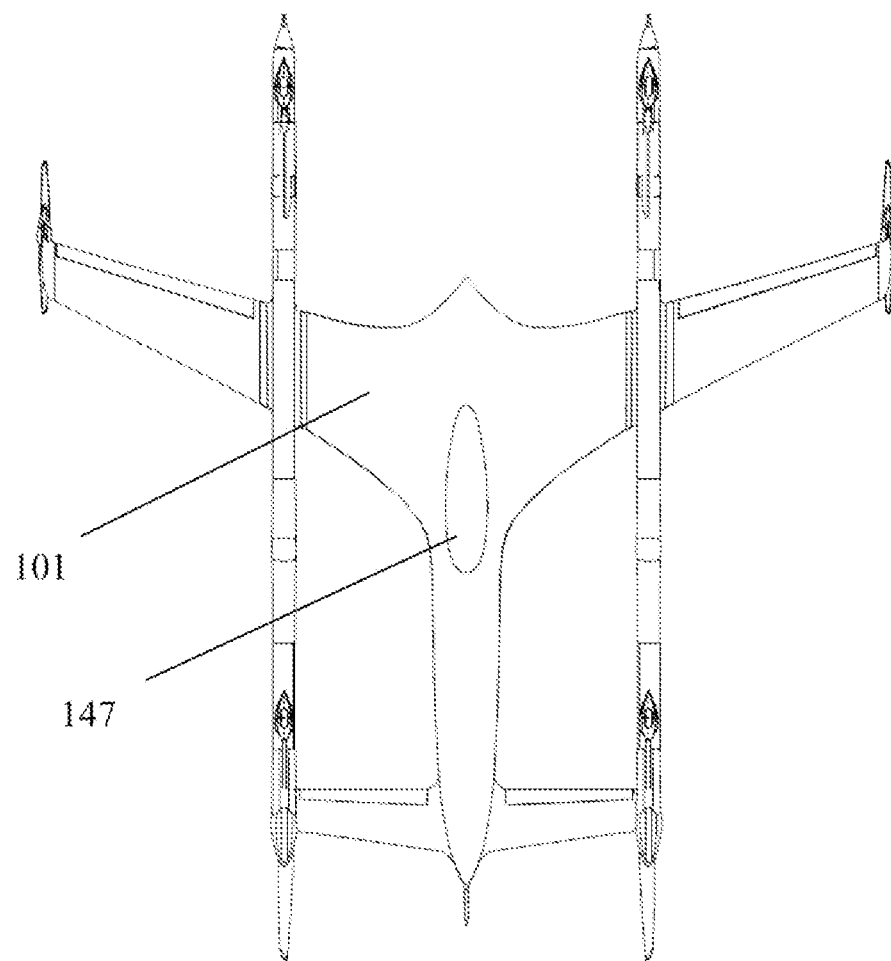
FIG. 24 is a bottom view of another embodiment of a flight platform according to another aspect of the embodiment.
Figure 25:
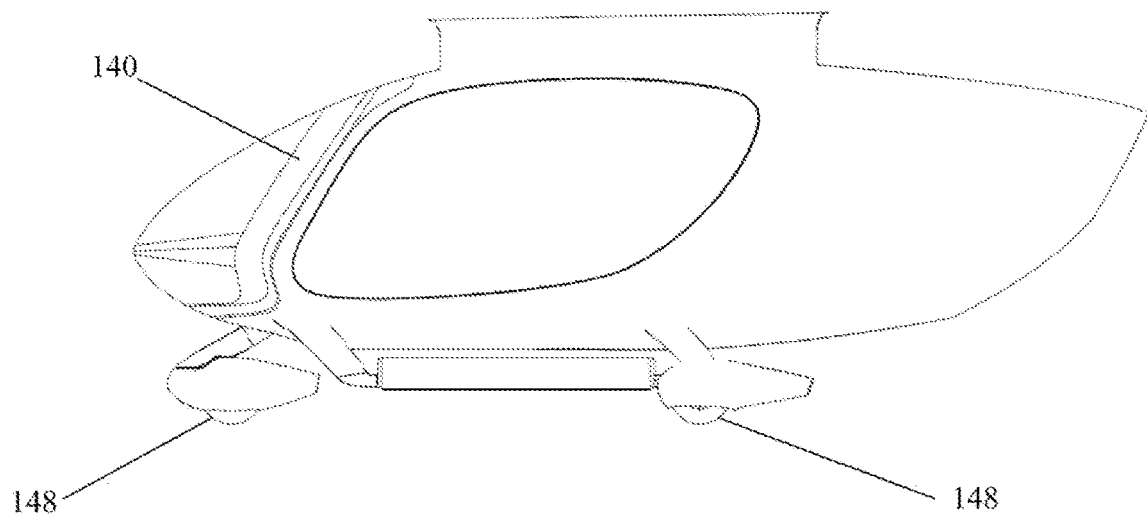
FIG. 25 is a side view of another embodiment of a passenger cabin according to another aspect of the embodiment.
Figure 26:
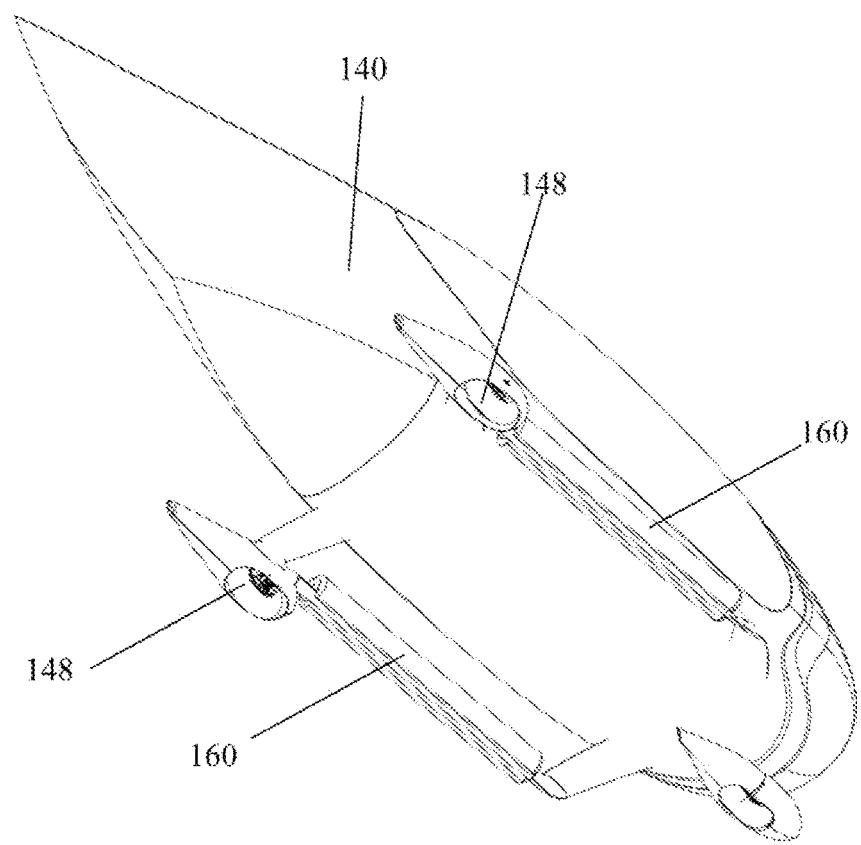
FIG. 26 is a bottom perspective view of another embodiment of a passenger cabin according to another aspect of the embodiment.
Figure 27:
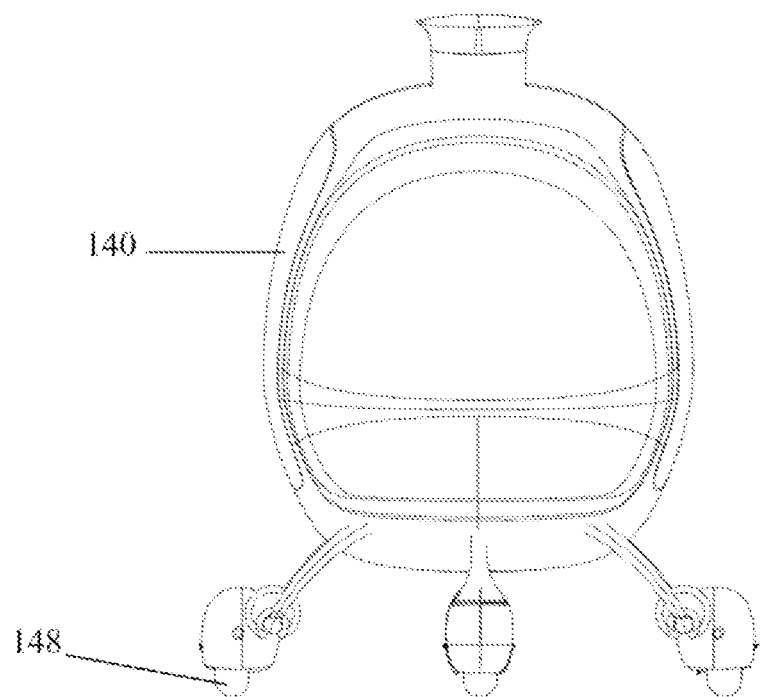
FIG. 27 is a front view of another embodiment of a passenger cabin according to another aspect of the embodiment.
Figure 28:
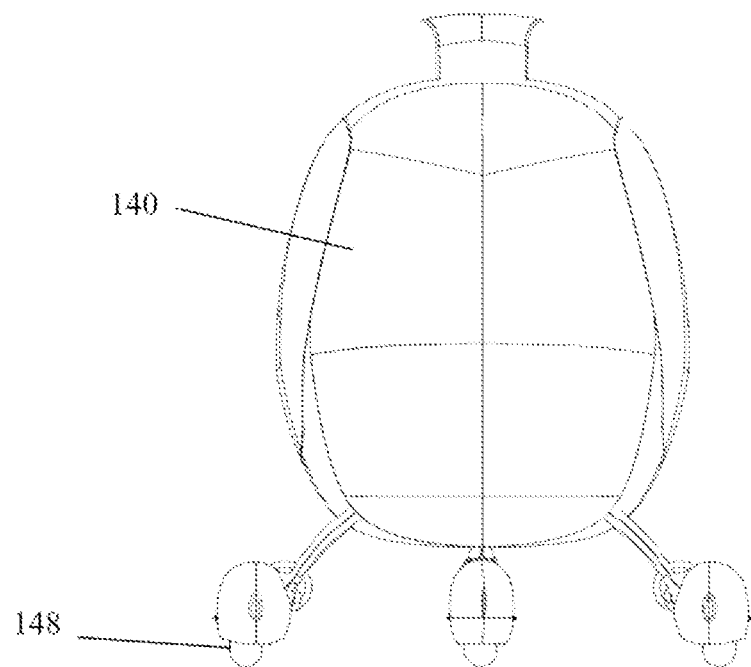
FIG. 28 is a rear view of another embodiment of a passenger cabin according to another aspect of the embodiment.
Figure 29:
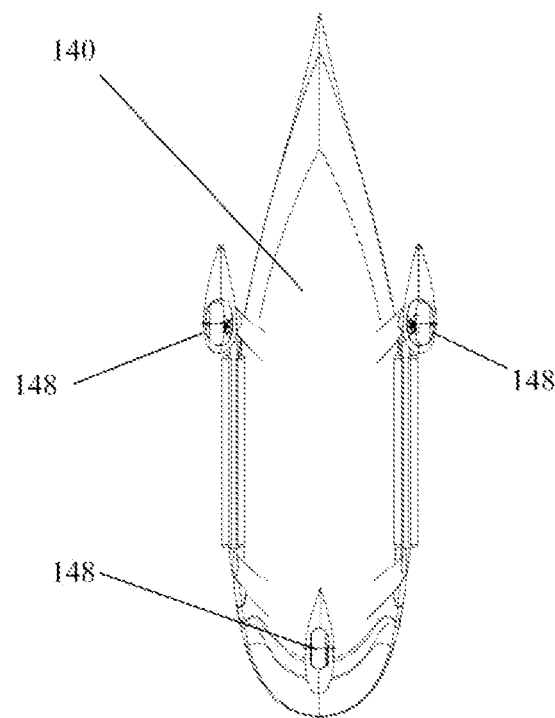
FIG. 29 is a bottom view of another embodiment of a passenger cabin according to another aspect of the embodiment.
Figure 30:
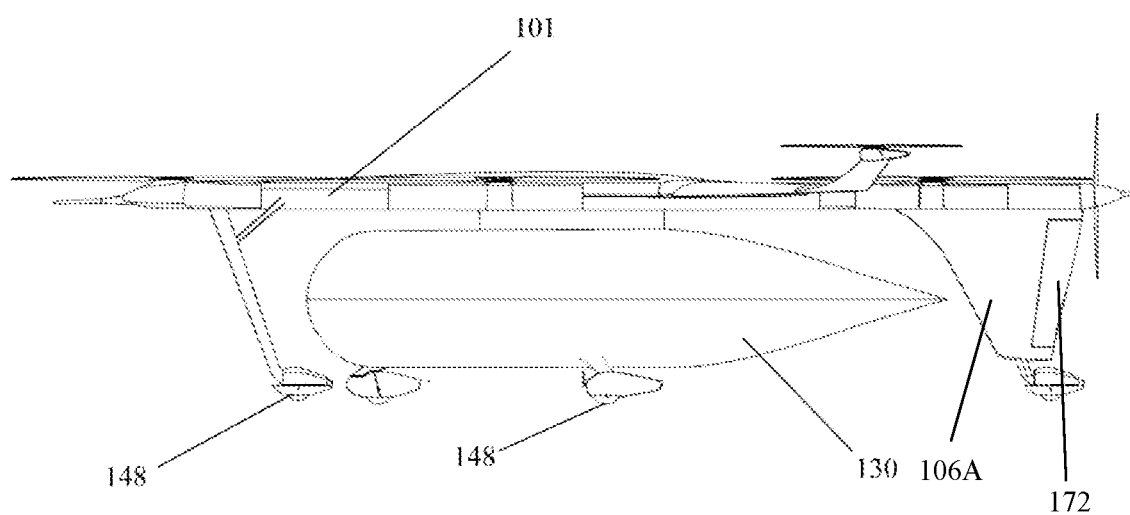
FIG. 30 is a side view of another embodiment of a flight platform attached to a cargo hold according to another aspect of the embodiment.
Figure 31:
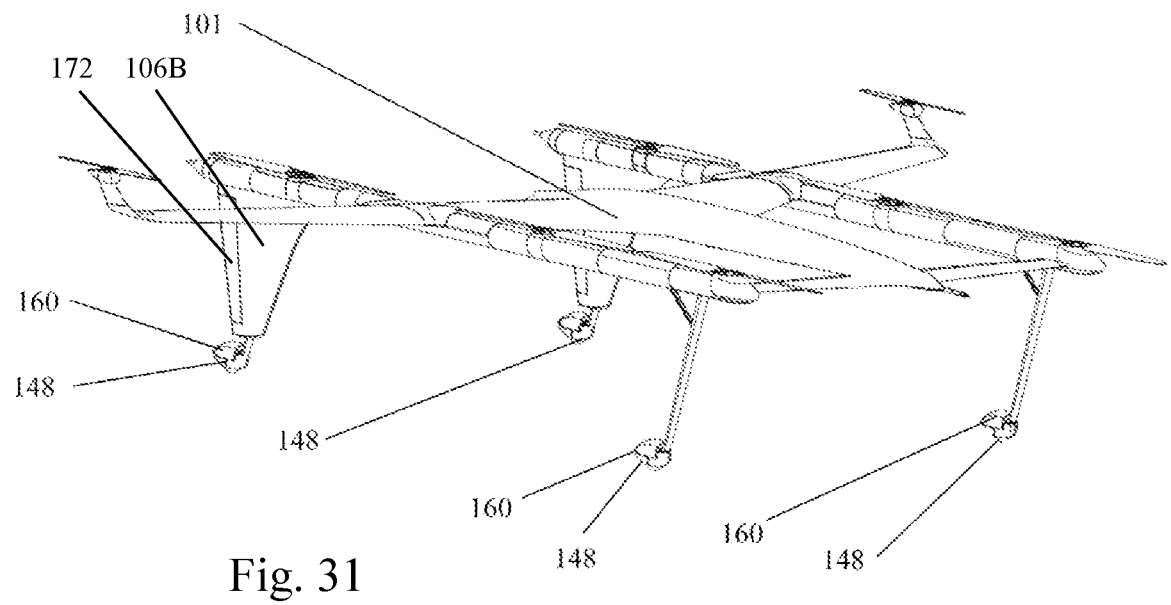
FIG. 31 is a perspective view of another embodiment of a flight platform without a propulsion propeller according to another aspect of the embodiment.
Figure 32:
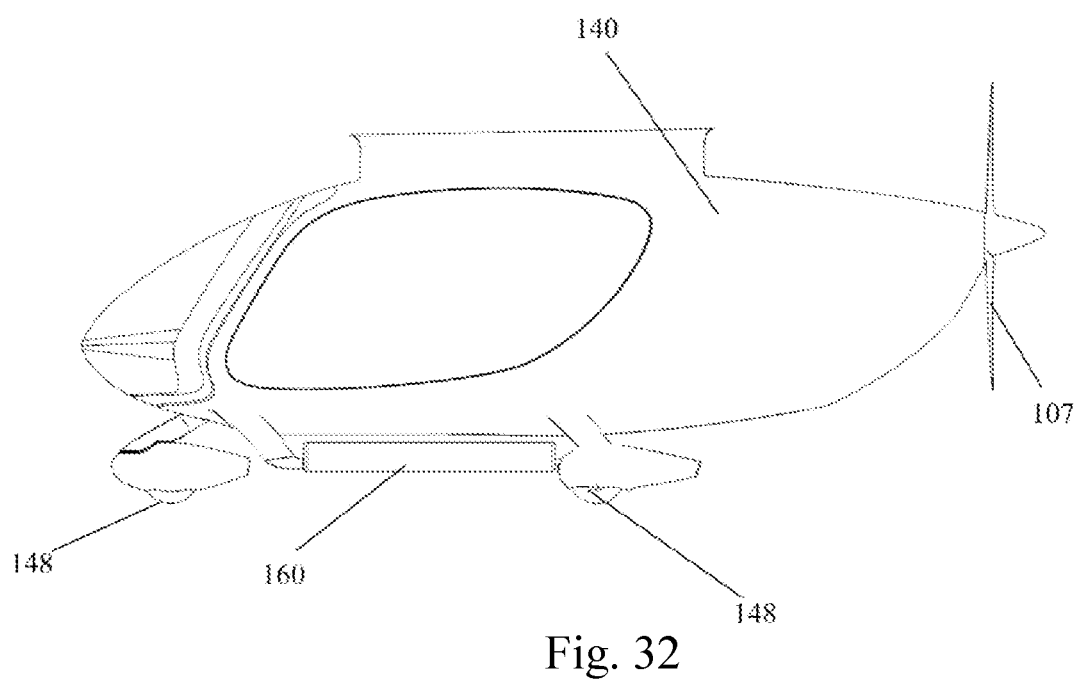
FIG. 32 is a side view of another embodiment of a passenger cabin with a propulsion propeller according to another aspect of the embodiment.
Figure 33:
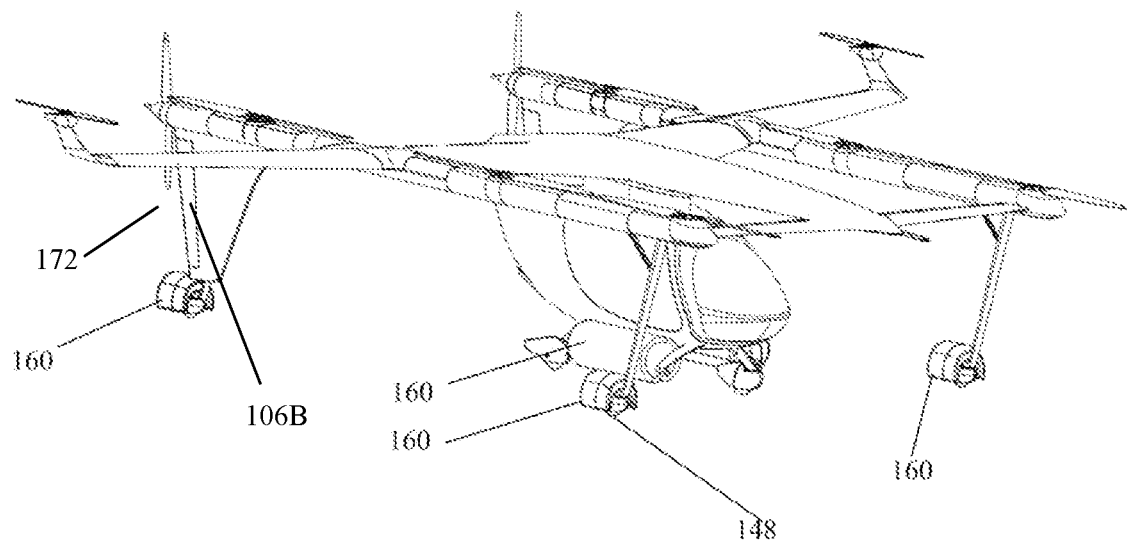
FIG. 33 is a perspective view of another embodiment of a flying UAV system wherein six floating devices are inflated.
Figure 34:
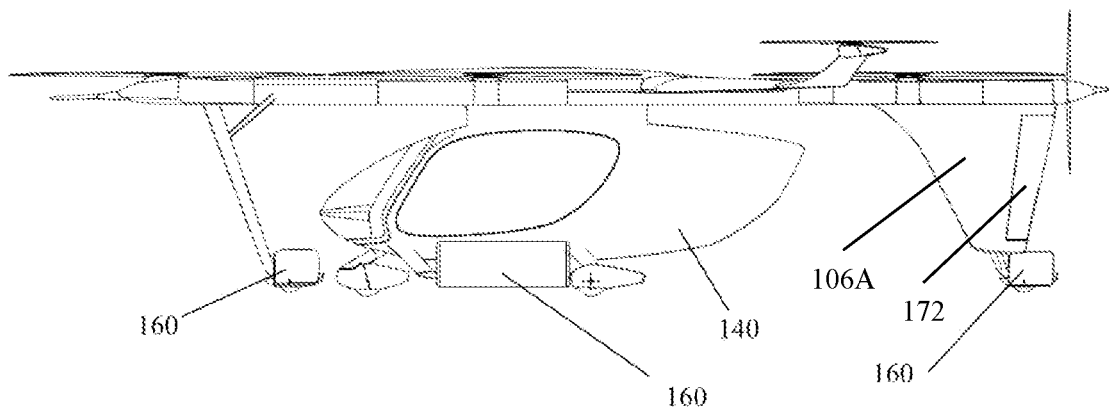
FIG. 34 is a side view of the flying UAV of FIG. 33.
Figure 35:
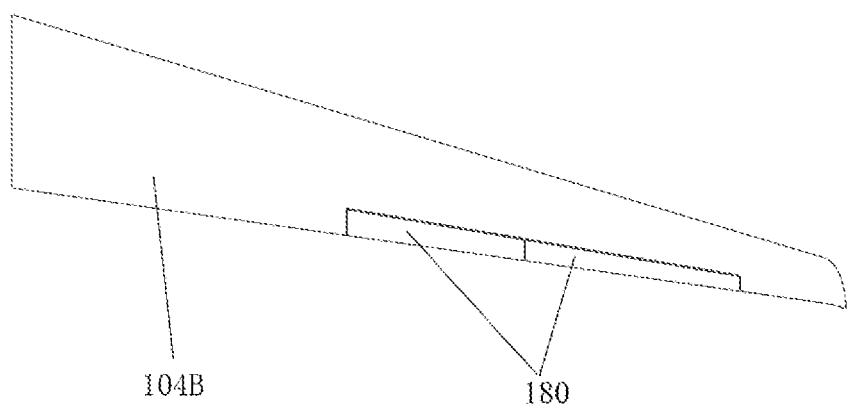
FIG. 35 is a diagram showing the configuration of an aileron of a UAV.

FIG. 1a is a top view of an embodiment of a UAV system according to one aspect of the embodiment; FIG. 1b is a schematic diagram showing the yaw of the UAV system shown in FIG. 1a; FIG. 1c is a top view of an embodiment of a UAV system according to another aspect of the embodiment; FIG. 1d is a top perspective view of an embodiment of a UAV system according to another aspect of the embodiment; FIG. 2 is a top rear perspective view of the UAV system of FIG. 1d; FIG. 3 is a side view of the UAV system of FIG. 1d; FIG. 4 is a top perspective view of another embodiment of a VTOL UAV system with a flight platform and a detachably attached cargo hold 130 according to one aspect of the embodiment; FIG. 5 is a top view of the UAV system of FIG. 4 according to one aspect of the embodiment; FIG. 6 is a front view of the UAV system of FIG. 4 according to one aspect of the embodiment; FIG. 7 is a perspective view of an embodiment of a VTOL UAV system with a flight platform and a detachably attached passenger cabin 140 according to one aspect of the embodiment; FIG. 8 is a front view of the UAV system of FIG. 7 according to one aspect of the embodiment; FIG. 9 is a rear perspective view of the UAV system of FIG. 7 according to one aspect of the embodiment; FIG. 10 is a side perspective view of the UAV system of FIG. 7 according to one aspect of the embodiment, wherein the cabin is separated from the flight platform and parked on the ground; FIG. 11 is a rear perspective view of the embodiment of FIG. 7 according to one aspect of the embodiment; FIG. 12 is a rear perspective view of another embodiment according to one aspect of the disclosure; FIG. 13 is a side bottom perspective view of another embodiment of a UAV system according to one aspect of the embodiment; FIG. 14 is a perspective view of an embodiment of a UAV system according to another aspect of the embodiment; FIG. 15 is a close-up view of the surrounding area in FIG. 14 according to another aspect of the embodiment; FIG. 16 is a side view of one embodiment of a UAV system according to another aspect of the embodiment; FIG. 17 is a front view of one embodiment of a UAV system according to another aspect of the embodiment; FIG. 18 is a rear view of one embodiment of a UAV system according to another aspect of the embodiment; FIG. 19 is a bottom view of one embodiment of a UAV system according to another aspect of the embodiment; FIG. 20 is a perspective view of another embodiment of a flight platform according to another aspect of the embodiment; FIG. 21 is a side view of another embodiment of a flight platform according to another aspect of the embodiment; FIG. 22 is a front view of another embodiment of a flight platform according to another aspect of the embodiment; FIG. 23 is a rear view of another embodiment of a flight platform according to another aspect of the embodiment; FIG. 24 is a bottom view of another embodiment of a flight platform according to another aspect of the embodiment; FIG. 25 is a side view of another embodiment of a cabin according to another aspect of the embodiment; FIG. 26 is a bottom perspective view of another embodiment of a cabin according to another aspect of the embodiment; FIG. 27 is a front view of another embodiment of a cabin according to another aspect of the embodiment; FIG. 28 is a rear view of another embodiment of a cabin according to another aspect of the embodiment; FIG. 29 is a bottom view of another embodiment of a cabin according to another aspect of the embodiment; FIG. 30 is a side view of another embodiment of a flight platform attached to a cargo hold 130 according to another aspect of the embodiment; FIG. 31 is a perspective view of another embodiment of a flight platform without a propulsion propeller according to another aspect of the embodiment; FIG. 32 is a side view of another embodiment of a cabin with a propulsion propeller according to another aspect of the embodiment; FIG. 33 is a perspective view of another embodiment of a flying UAV system wherein six floating devices are inflated; FIG. 34 is a side view of the flying UAV of FIG. 33; FIG. 35 is a diagram showing the configuration of an aileron of a UAV.

FIG. 1a and FIG. 1c generally depict an embodiment of a VTOL aerial UAV 100 with a propulsion propeller or a traction propeller. As shown in FIG. 1a and FIG. 1c, the fixed wing UAV 100 provided by this embodiment includes propellers arranged parallel to each other on both sides of the fixed wing UAV 100 and providing thrust for the fixed wing UAV 100. It is easy to understand that the UAV 100 can drive the UAV 100 forward through the rotation of the propeller on the UAV 100. It should be noted that the distance between the rotation axis of the propeller on both sides of the UAV 100 and the central axis of the UAV 100 is equal so that when the rotation speeds of the propellers on both sides of the UAV 100 are the same, the UAV 100 will not be driven to yaw.

Continuing to refer to FIG. 1a, FIG. 1c and FIG. 1d, one possible implementation is that the fixed wing UAV 100 includes a main body 102, a main wing, a front wing and a linear support, wherein the main wing includes a left main wing 104A and a right main wing 104B, and the left main wing 104a and the right main wing 104B are positioned on opposite sides of the main body 102 and engaged with the main body 102, that is, the left main wing 104A and the right main wing 104B are positioned on the left and right sides of the main body 102, respectively, and the left main wing 104A is opposite to the right main wing 104B. Those skilled in the art can understand that the main wing is the wing with the largest horizontal section on both sides of the fuselage, and the UAV 100 can generate lift during flight so that the UAV 100 can fly stably in the air.

FIG. 1a, FIG. 1c and FIG. 1d show that the front wing is positioned in the front of the main wing, the front wing includes the left front wing 105A and the right front wing 105B, and the left front wing 105A and the right front wing 105B are engaged with the main body 102 and positioned on opposite sides of the main body 102, respectively. In this embodiment, the size of the interval between the front wing and the main wing is not limited, and those skilled in the art can set it according to actual needs. Those skilled in the art can understand that the front wing is used to control the flight attitude of the UAV 100, that is, the pitch of the UAV 100.

As shown in FIG. 1a, FIG. 1c and FIG. 1d, the linear support includes a left linear support 103A and a right linear support 103B. Preferably, the longitudinal axes of the left linear support 103A, the right linear support 103B and the main body 102 are arranged parallel to each other so as to avoid the air resistance of the air to the UAV 100 during the flight of the UAV 100. The left linear support 103A is engaged with the left main wing 104A, and the right linear support 103B is engaged with the right main wing 104B. Those skilled in the art can understand that the linear support may be used for the lift propeller and the motor driving the lift propeller, making the structure of the main body 102 of the UAV 100 more compact.

As shown in FIG. 1a and FIG. 1b, propellers are provided at the rear ends of the left linear support 103A and the right linear support 103B, respectively, that is, two propellers may be used as the propulsion propeller 107. Here, it is defined that the propeller at the rear end of the left linear support 103A is the left propulsion propeller 107A107, and the propeller at the end of the right linear support 103B is the right propulsion propeller 107B107. When the rotation speeds of the left propeller 107B107 are different, the UAV 100 will yaw to the side with low rotation speed.

In another possible implementation, as shown in FIG. 1c, propellers are provided at the front ends of the left linear support 103A and the right linear support 103B, respectively, that is, two propellers may be used as traction propellers 170B, 170A. Here, it is defined that the propeller at the front end of the left linear support 103A is the left traction propeller 170B, 170A, and the propeller at the front end of the right linear support 103B is the right traction propeller 170B, 170A. When the rotation speeds of the left and right traction propellers 170B, 170A are different, the UAV 100 will yaw to the side with low rotation speed.

It is easy to think that propellers may be provided at both the front end and the front end of the linear support, that is, the propeller at the front end of the linear support is a traction propeller 170B, 170A, and the propeller at the rear end of the linear support is a propulsion propeller 107. It is also possible to realize the active yaw of the UAV 100 through different rotation speeds of the propellers at the left and right sides.

Preferably, the rotation axis of the propeller is parallel to the rotation axis of the linear support, so that all the force generated by the rotation of the propeller is used for the forward flight of the UAV 100 to improve the energy utilization of the propeller.

Those skilled in the art can understand that the fixed wing UAV 100 provided by the embodiment may also be provided with a rudder 172, for example, the rudder 172 arranged on the top of the body may rotate around a vertical straight line so as to control the UAV 100 to yaw left or right when the rudder 172 rotates to a fixed position. It should be noted that when the rudder 172 is used to control the yaw of the UAV 100, the rotation speed of the propeller of the UAV 100 may be the same or different. When the rotation speeds of the propellers on both sides are different, the yaw torque provided by the propellers for the UAV 100 is the same as that provided by the rudder 172.

Of course, in another possible implementation, the UAV 100 may realize the active yaw of the UAV 100 only by different rotation speeds of the propellers on both sides of the fixed wing UAV, that is, the fixed wing UAV 100 may realize the yaw of the UAV 100 by using the propellers without a rudder 172 so as to avoid frequent maintenance of the rudder 172 and reduce the complexity of the structure of the UAV 100.

In another aspect of the embodiment, the fixed wing UAV 100 includes at least two propellers 107A and 107B arranged parallel to each other and providing thrust for the UAV, or two traction propellers 170A and 170B arranged parallel to each other and providing thrust for the UAV; A plurality of motors (not shown) configured to drive two propulsion propellers or two traction propellers, respectively, wherein the thrust ratio provided by two propulsion propellers or the thrust ratio provided by two traction propellers is changed to generate asymmetric thrust, which controls the active yaw of the UAV.

If the aerial UAV provided in the disclosure needs yaw is used, when yaw is required, it only needs to change the thrust ratio provided by two propulsion propellers or the thrust ratio provided by two traction propellers to enable the UAV to generate yaw torque around the vertical axis so as to control the heading change of the UAV.

FIG. 1d generally depicts an embodiment of a VTOL aerial UAV 100 with a front wing configuration.

The UAV shown in the drawing has partially the same structural configuration, and its component characteristics may be freely combined and configured. The drawing is only exemplary.

The UAV 100 of FIG. 1d may have two main wings 104A, 104B and two front wings 105A, 105B. Two main wings 104A, 104B and two front wings 105A, 105B may be attached to the main body 102, wherein the main body may be positioned along the central longitudinal line of the UAV 100. There may also be a left linear support 103A arranged parallel to the main body 102, and the left main wing 104A may be connected to the left front wing 105A. Similarly, there may also be a right linear support 103B arranged parallel to the main body 102, and the right main wing 104B may be connected to the right front wing 105B. Among them, the front wing of UAV mainly controls the flight attitude of the UAV during flight, such as controlling the pitch of the UAV. As the largest wing on both sides of the fuselage, the main wing of UAV is usually used to generate lift to support the UAV flying in the air, and also plays a certain role in stabilization and control.

In another embodiment, the UAV 100 is not provided with a front wing. On the contrary, the UAV 100 may have two main wings and two ailerons, all of which are engaged with each other to form a flight platform.

In one embodiment, as shown in FIG. 35, the aileron 180 of the UAV may be arranged on the rear side of the main wing 104B, there may at least one aileron, preferably two, in laminar structure, which may move up and down to control the roll of the aircraft.

The left and right linear supports 103A, 103B are expected to improve the structural integrity of the UAV 100. In other embodiments, the left and right linear supports 103A and 103B may accommodate drive motors (not shown) driving each lift propeller 108A, 108B, 108C, 108D, 108E, 108F. Therefore, the left and right linear supports 103A and 103B may be used to fix the lift propeller and reduce the use of UAV components. While simplifying the structural components of the UAV, the left and right linear supports 103A and 103B may also improve the overall strength of the UAV because they are engaged with two front wings and two main wings. As will be disclosed later, the left and right linear supports 103A and 103B may also accommodate folding legs 111, and each folding leg may retractable into the left and right linear supports 103A and 103B.

In one embodiment, the left and right linear supports 103A, 103B are attached to the distal ends of the left and right front wings 105A, 105B, respectively. In another embodiment, the left and right linear supports 103A, 103B extend beyond the front wings 105A, 105B.

In one embodiment, the left and right linear supports 103A, 103B are attached near the middle portions of the left and right main wings 104A, 104B, respectively. In another embodiment, the left and right linear supports 103A, 103B extend in a rearward direction beyond the main wings 104A, 104B.

The left linear support 103A is expected to be relatively narrow in diameter and may have a plurality of lift propellers 108A, 108B, 108C arranged on the top side, bottom side, or both of the left linear support 103A. These lift propellers 108A, 108B, 108C may be driven by a low-profile motor arranged in the hollow interior of the left linear support 103A. In the embodiment shown in FIG. 1d, the lift propellers 108A, 108B and 108C are only arranged on the top side of the left linear support 103A. It should be noted that the number of lift propellers shown in the figure is only for illustrative purposes. The disclosure does not limit the number. In practice, lift propellers may be increased or decreased according to demand. Similarly, the right linear support 103B is expected to be relatively narrow in diameter and may have a plurality of lift propellers 108D, 108E, 108F arranged on the top side, bottom side or both of the right linear support 103B. These lift propellers 108D, 108E, 108F may be driven by a low-profile motor arranged in the hollow interior of the right linear support. In the embodiment shown in FIG. 1d, the lift propellers 108D, 108E and 108F are only arranged on the top side of the right linear support 103B. It should be noted that the number of lift propellers shown in the figure is only for illustrative purposes. The disclosure does not limit the number. In practice, lift propellers may be increased or decreased according to demand.

The UAV 100 may have at least one propulsion propeller 107 to push the UAV 100 in a forward direction. In one embodiment as shown in FIG. 1a and FIG. 1b, there may be two propellers 107A and 107B. The two propulsion propellers 107A and 107B may be arranged on the distal ends of rear side of the linear supports 103A and 103B, respectively.

In one embodiment, the UAV 100 may have at least one traction propeller to pull the UAV in a forward direction, which may be arranged at the front end of the UAV main body. Further, as shown in FIG. 1c, the UAV 100 may have two traction propellers 170A and 170B, which may be arranged at the front ends of the linear supports 103A and 103B, respectively. The traction propellers provide thrust for the UAV 100.

In one embodiment, the UAV 100 may have a plurality of motors for driving the propulsion propellers 107A, 107B, or two traction propellers, respectively.

Among them, the thrust ratio provided by two propulsion propellers 107A and 107B or the thrust ratio provided by two traction propellers may be changed to produce asymmetric thrust, which can control the active yaw of the UAV 100, as shown in FIG. 1B. It can be seen that due to the different thrust ratios provided by the two propulsion propellers or the different thrust ratios provided by the two traction propellers, the forces of the UAV in all directions are uneven, thereby achieving active yaw.

Since most of the existing VTOL UAVs have single thrust motors, if the single thrust motor fails, the UAV will lose power, resulting in low reliability. The disclosure adopts two propulsion propellers or two traction propellers to provide thrust for the UAV, and a plurality of thrust motors are backup to each other. Therefore, the reliability is high.

In one embodiment, the UAV also includes a rudder 172. When the rudder 172 fails, the microprocessor 175 (see FIG. 1B) can directly change the thrust output ratio to compensate the rudder 172. It should be noted that the microprocessor 175 (see FIG. 1B) here can be arranged inside or outside the UAV, the disclosure does not limit it provided that it can control the UAV. When the rudder 172 of UAV is in normal use, the heading of the UAV may be changed with the rudder 172. When the rudder 172 fails, the heading may also be changed by changing the thrust output ratio of two propulsion propellers or two traction propellers.

In one embodiment, the UAV also includes a plurality of lift propellers configured to provide a vertical take-off and landing function for the UAV.

In one embodiment, the UAV also includes a left main wing and a right main wing, as well as a left front wing and a right front wing, wherein the left front wing and the right front wing are arranged in front of the left main wing and the right main wing. The left and right main wings and the left and right front wings of the UAV are engaged with each other to form a flight platform, which improves the flight stability of the UAV.

In one embodiment, the UAV also includes a left linear support and a right linear support, wherein the left linear support and the right linear support are arranged parallel to each other, the left linear support connects the left main wing with the left front wing, and the right linear support connects the right main wing with the right front wing. The left and right main wings and the left and right front wings are connected through the left and right linear supports, respectively, resulting in more stable UAV structure and improved overall strength of the UAV.

In one embodiment, the UAV also includes a detachable cargo hold 130 or passenger cabin 140 attached to its bottom side. Through the above arrangement method, the UAV structure may be flexibly adjusted. According to the actual situation, the cabin can be installed when necessary and disassembled when unnecessary so as to flexibly use the UAV in response to different needs and improve its adaptability.

In one embodiment, two propulsion propellers are arranged at the rear end of each of the left linear support and the right linear support, respectively. When the thrust power system works, it can improve the lift and flight time of the UAV.

In one embodiment, two propulsion propellers are configured to provide thrust for the UAV.

In one embodiment, two traction propellers are configured to provide thrust for the UAV.

In one embodiment, the UAV does not have a rudder 172, and the UAV is a fixed wing UAV with VTOL function. When the UAV does not have a rudder 172, the heading of the UAV maybe changed by changing the thrust ratio of two propellers or two traction propellers arranged for the UAV. The UAV provided in the disclosure may be equipped with a plurality of lift propellers, such as the lift propellers 108A, 108B, 108C, 108D, 108E and 108F shown in FIG. 1a, FIGS. 1c and 1d, so that the UAV has the VTOL function.

In one embodiment, the UAV does not have any control interface. The UAV may be controlled by remote control and allow for the interaction between passengers and the UAV in a friendly way, so as to control the heading of the UAV and improve the user experience.

It should be noted that the thrust propeller providing thrust for UAV or the traction propeller providing thrust for UAV in the above may be the thrust motor configured for the purpose of providing the thrust for the thrust propeller to provide thrust for UAV, or the thrust motor configured for the traction propeller to provide thrust for UAV.

For the VTOL UAV provided in the disclosure, two thrust motors (or thrust systems) may be installed at the rear of the arms on both sides (i.e., left and right linear supports) to drive the propulsion propellers 107A and 107B (i.e., the UAV has two sets of thrust systems). In the cruise flight stage of the UAV, the two sets of thrust systems provide power for the UAV simultaneously, and with the same output power, the UAV will keep flying in a straight-line route. When the UAV needs to change the heading, the output power of either thrust system or both thrust systems may change. After the output power changes, the thrust generated by the two thrust systems for the UAV may change. The thrust of either thrust system increases and the thrust of the other thrust system decreases, causing the UAV to generate yaw torque around the vertical axis, so as to control the heading change of the UAV (as shown in FIG. 1b). When the UAV completes the heading maneuver, the output power of either or both thrust systems will change so that the two thrust systems continue to maintain the same output power to provide level flight power for the UAV and enable the UAV to continue to keep its flight route.

According to the technical solution of the disclosure, two thrust systems are installed at the rear of the UAV arm so as to increase the system reliability. Further, it is practical to change the output power of the two thrust systems to change the thrust of the thrust systems so as to achieve the UAV yaw maneuver flight. Further, it is also practical to change the output power of the two thrust systems to change the thrust of the thrust systems and increase the stability of the system due to rudder and aileron failure. Therefore, the fixed wing UAV provided by the disclosure improves the reliability of UAV thrust system and UAV active yaw.

The above heading change principle of the UAV is also applicable to the case where two traction propellers are arranged on the UAV.

In another embodiment, such as the embodiment shown in FIG. 31, the flight platform 101 may not push the propeller. In such an embodiment, the flight platform 101 may be attached to a cabin 140 or cargo hold 130 on which a propulsion propeller is provided. FIG. 32 shows an embodiment of a cabin 140 having a propulsion propeller arranged at its rear end. When the passenger cabin 140 is attached to the flight platform 101 of FIG. 31, the propulsion propeller will push forward the flight platform 101.

Two vertical stabilizers 106A and 106B may be arranged near the rear end of each linear support 103A and 103B, respectively. Although they are shown pointing downward, there may also be embodiments in which they point upward.

In another embodiment, each of the main wings 104A and 104B may have wingtip lift propellers 109A and 109B, respectively, arranged at the distal end thereof. This can be achieved by arranging wingtip vertical stabilizers 110A and 110B at the distal ends of the main wings 104A and 104B, respectively, and providing lift propellers 109A and 109B arranged at the upper tip of each wingtip vertical stabilizer 110A and 110B. These wingtip lift propellers 109A, 109B may be relatively smaller than the lift propellers provided on the linear supports 103A, 103B.

These wingtip lift propellers 109A and 109B may be used to effectively and efficiently control the rolling of the UAV 100. These wingtip lift propellers 109A and 109B are positioned at the farthest position away from the central axis of the UAV 100, which is effective in adjusting the rolling of the UAV 100 and may be realized by using a diameter smaller than that of other lift propellers.

As further shown in FIG. 1d, there is a cabin 130 normally attached below the main body 102 of the UAV 100.

Now referring to the details of FIG. 2, the UAV 10 is expected to use any type of landing gear. In one embodiment, the UAV 100 may have four single-leaf springs 112A, 112B, 112C, 112D as its landing gear. The first two single-leaf springs 112A and 112C are arranged on the distal ends of the folding legs 111A and 111B, respectively. During flight, the folding legs 111A and 111B may be retracted into the internal space of the left and right linear supports 103A and 103B, respectively.

The two left single-leaf springs 112B and 112D at the rear are expected to be arranged at the distal ends of the bottom of the vertical stabilizers 106A and 106b, respectively.

The expected single-leaf springs 112A, 112B, 112C, 112D may be made of suitable materials to provide sufficient elasticity and integrity, including natural and synthetic polymers, various metals and metal alloys, natural materials, textile fibers, and all reasonable combinations thereof. In one embodiment, carbon fiber is adopted.

Now turning to FIG. 3, it shows a cabin as cargo hold 130. The cargo hold 130 may have single-leaf springs 135A, 135B, 135C, 135D as its landing gear. Alternatively, it may have other types of landing gear, such as rails, legs, and wheels.

In the intended embodiment, the cargo hold 130 may be disassembled from the rest of the UAV 100. The rest of the UAV may be referred to as flight platform 101. The flight platform 101 can fly without a cabin, and it may carry different cabins interchangeably. As will be described later, the flight platform 101 may also carry a passenger cabin.

In the example shown, all cabins 130, 140 are carried below the flight platform 101. It is expected that the cabins 130, 140 are loaded on the ground, and the loading process can be completed before or after the flight platform 101 is attached to the cabins 130, 140.

FIG. 5 shows a top view of the flight platform 101. It may have a substantially flat structure and can carry a load below or above it. During high-speed flight, all six lift propellers 108A, 108B, 108C, 108D, 108E, 108F can be locked in place so that each leaf is parallel to the main body 102.

FIG. 5 shows an embodiment of a flight platform 101, wherein the length of the front wings 105A and 105B is not longer than half the length of each main wing 104A and 104B.

FIG. 6 generally depicts a front view of a flight platform 101 with a detachably attached cargo hold 130. Whether it is cargo hold 130, passenger cabin 140 or any other type of load, it is particularly expected that there may be an energy storage unit 150 provided in the main body 102 of the flight platform. The stored energy may be used to power other components of the flight platform, such as lift propellers 108A, 108B, 108C, 108D and propulsion propellers 107A, 107B. The stored energy may be electricity, and the storage unit is a battery. In another embodiment, the energy storage 150 may be used to power accessories in cabins 130 and 140.

The battery 150 may also be provided in other parts of the flight platform 101, such as in linear supports 103A and 103B.

Alternatively or optionally, there may be an energy storage unit 155 provided in the cabins 130, 140. The energy stored in the storage unit 155 may be used to power the lift propellers 108A, 108B, 108C, 108D and the propulsion propellers 107A, 107B. The stored energy may be electricity, and the storage unit is a battery. By having an energy storage unit 155 in the cabins 130 and 140, the flight platform 101 will have a supplementary energy source whenever the flight platform 101 receives the new cabins 130 and 140. The flight platform 101 itself may be an emergency energy storage or a small capacity battery 150 to provide power to the flight platform 101 in a short time when the flight platform 101 flies without the cabins 130 and 140. In one embodiment, the main power supply of the flight platform 101 comes from the battery 150 positioned in the cabins 130 and 140. In this way, when the flight platform 101 replaces the old cabins 130 and 140 with the new cabins 130 and 140, the flight platform 101 or the whole VTOL UAV system 100 will have a fully charged energy source. This is a useful method, and there is no need for the VTOL UAV to charge itself. In a preferred embodiment, the flight platform 101 may work/fly continuously for hours or even days, pick up the cargo hold/passenger cabin and unload the cargo hold/passenger cabin without stopping to charge its battery.

Now referring to the details of FIG. 7, a passenger cabin 150 is provided. The passenger cabin 150 may use any type of landing gear, such as rigid legs 145A, 145B, 145C, 145D as shown in the figure.

FIG. 10 generally depicts an aspect of the disclosure, wherein the cabin (whether the cargo hold 130 or passenger cabin 140) is detachable. Here, the cabin 140 may be selectively separated from the flight platform 101. The engagement and disengagement between the flight platform 101 and the cabin 140 may be performed autonomously by a computer and/or other sensors and computing devices (without simultaneous user intervention). Alternatively or optionally, the user may actively control and guide the engagement and disengagement between the flight platform 101 and the cabin 140.

As ordinary people skilled in the art will recognize, various types of engagement mechanisms 147 may be used to secure the cabin 140 to the flight platform 101. For example, the engagement mechanism may be a mechanical latch, a magnetic latch, a track and groove, or any combination of known engagement methods.

It is important to understand that, in addition to having two propulsion propellers 107A and 107B (as shown in FIG. 11), alternatively or optionally, there may be a central propulsion propeller 117 connected to the rear end of the main body 102 (as shown in FIG. 12). As shown in FIG. 12, the central propulsion propeller 117 is engaged with the rear end of the main body 102 through the vertical expander 116. The vertical expander 116 may be any structure of any shape to physically engage with the propulsion propeller 117 so that the rotation center of the propulsion propeller 117 deviates vertically from the main body 102. In another embodiment, the propulsion propeller 117 deviates vertically from the main body 102 so that the rotation center of the propulsion propeller 117 is vertically flush with the rear of the cabin 140. In another embodiment, the propulsion propeller 117 is vertically flush with the top of the cabin 140. In another embodiment, the propulsion propeller 117 is vertically flush with the middle of the cabin 140. In a further embodiment, the propulsion propeller 117 is vertically flush with the bottom of the cabin 140.

What is not shown in any figure of the embodiment is that the propulsion propellers 107A and 107B are not provided at the ends of the linear supports 103A and 103B, respectively. On the contrary, only one propulsion propeller 117 is engaged with the rear end of the main body 102.

It may also be envisaged that each linear support 103A and 103B may include more than three lift propellers by providing longer linear supports to accommodate more lift propellers, by using lift propellers of smaller diameter, or by placing lift propellers on both the top and bottom sides of the linear support. FIG. 13 shows an embodiment wherein two additional lift propellers 108G and 108H are arranged at the front end of the bottom of the linear supports 103A and 103B.

Although the propulsion propellers 107A and 107B have been shown in the previous figure to be positioned at the rear distal end of the linear supports 103A and 103B, it is particularly expected that these propulsion propellers 107A and 107B can be arranged at a horizontal plane lower than the main wings 104A and 104B, such as those shown in FIG. 13. On one hand, these propulsion propellers 107A and 107B may be arranged at a level substantially equal to the cabins 130 and 140 carried by the flight platform. On the other, these propulsion propellers 107A and 107B may be arranged in the middle of the vertical stabilizers 106A and 106B. One expected reason for reducing the arrangement of the propulsion propellers 107A and 107B is to minimize the head dipping effect during flight, which may be caused by the aerodynamic effect caused by the cabins 130 and 140.

FIGS. 14 to 30 show an embodiment wherein the flight platform 101, or the cabins 130 and 140, or both may have an electric wheel 148 attached thereto. In the embodiment of FIG. 14, the flight platform 101 has an electric wheel 148; the cabins 130 and 140 also have electric wheels. Now referring to the embodiment of FIG. 15, a single electric wheel unit 148 may have a motor enclosed in the housing 149, and the motor may be driven by power supplied by the energy storage unit 150 provided in the cabins 130 and 140.

It is envisaged that the electric wheel 148 may move the flight platform 101 and the cabin 130 on the ground when they are parked on the ground. This allows the cabin 130 or 140 to move away from the flight platform 101 and allows the other one of cabin 130 or 140 to move itself to the flight platform 101 for engagement.

Alternatively, this may allow the flight platform 101 to move away from the cabin 130 and towards another cabin for engagement. In one embodiment, each cabin 130, 140 may have an energy storage unit 155 so that when the flight platform 101 is engaged with the new and fully charged cabins 130, 140, the flight platform 101 will basically supplement its energy source.

In some embodiments of the disclosed unmanned aircraft system, at least one floating device 160 may be provided, which is engaged with at least any of the cargo hold 130, the passenger cabin 140 and the flight platform 101. The floating device may be of a type that needs to be actuated, that is, actively inflated with gas or material when required. In other words, in this particular embodiment, the floating device 160 may remain in the deflated state and expand only when certain conditions trigger inflation. For example, the floating device 160 may automatically inflate during an emergency landing; it may inflate automatically when landing on water; when any landing gear fails in some aspect, it may be inflated.

Many known types of inflation mechanisms or airbag mechanisms may be implemented to achieve the needs and configuration of the disclosed floating device 160. The expected floating device 160 may be of a type that can be reused, re-inflated and re-deflated repeatedly. The intended floating device 160 may also be disposable only.

Alternatively or optionally, the inflation behavior may be activated by the user. For example, when the operator of the UAV system determines that the floating device 160 needs to be inflated, he or she may send a signal to start inflation.

In some embodiments, it should be noted that the floating device 160 does not need to have an electric wheel 148. In other embodiments, the floating device 160 is part of the housing of the electric wheel 148.

Referring to FIG. 26 as an example, the passenger cabin 140 may have an extended floating device 160 arranged on either side of the cabin 140, which may be used as a waterborne landing gear. In FIG. 26, these floating devices 160 are shown as deflated. FIG. 32 shows a side view of the deflated floating device 160. As shown in FIGS. 33 and 34, the floating device 160 engaged with the passenger cabin 140 is shown as inflated.

Referring to FIG. 31 as another example, the flight platform 101 may have four floating devices 160 arranged on the top of each of the four electric wheels 148. These floating devices 160 may alternatively be attached to or close to the electric wheel 148 at other positions. In FIG. 31, these floating devices 160 engaged with the electric wheel 148 are shown as deflated. FIGS. 33 and 34 show an inflated floating device 160 of the flight platform 101.

Many changes and modifications can be made by those skilled in the art without departing from the spirit and scope of the disclosed embodiments. Therefore, it must be understood that the illustrated embodiments are proposed only for the purpose of example and should not be regarded as limiting the embodiments defined by the attached technical solution. For example, despite the fact that the elements of the technical solution are presented below in some combination, it must be clearly understood that the embodiment includes other combinations of fewer, more or different elements, which are disclosed herein, even if such combinations are not limited initially.

Therefore, specific embodiments and applications of VTOL flight platforms with interchangeable cabins have been disclosed. However, it will be apparent to those skilled in the art that more modifications other than those already described are possible without departing from the concepts disclosed herein. Therefore, in addition to the spirit of the attached technical scheme, the disclosed embodiments are unrestricted. In addition, when interpreting the specifications and technical solution, all terms shall be interpreted in the manner as extensive as possible that is consistent with the context. In particular, the terms "include" and "contain" should be interpreted as referring to an element, component or step in a non-exclusive manner, indicating that the referenced element, component or step may exist, or be utilized, or be combined with other elements, components or steps not explicitly referenced. Non-substantive changes in the claimed subject matter known now or expected later to be seen by those skilled in the art are clearly expected to be equivalent within the scope of the technical solution. Therefore, obvious substitutions now or hereafter known to those of ordinary people skilled in the art are defined as being within the scope of the defined elements. Therefore, the technical solution should be understood as including the contents specifically explained and described above, the contents that are conceptually equivalent, the contents that can be obviously replaced, and the contents that basically include the basic idea of the embodiment. In addition, in the case where the specifications and the technical solution involve at least one element selected from the group consisting of A, B, C . . . and N, the text should be interpreted as requiring at least one element in the group to include N, rather than A plus N, or B plus N, etc.

The invention claimed is:

1. A method of flight control for a fixed-wing unmanned aerial vehicle (UAV) comprising:
  having the fixed-wing UAV to have
  a) a left main wing and a right main wing;
  b) a left forewing and a right forewing respectively shorter than the left main wing and the right main wing;
  c) a main body coupled to the left main wing and the right main wing;
  d) a left linear support connecting the left main wing to the left forewing;
  e) a right linear support connecting the right main wing to the right forewing;
  providing a first, a second, a third lifting propellers to be disposed on the left linear support;
  providing a left vertical stabilizer coupled to the left linear support;
  providing a fourth, a fifth, a sixth lifting propellers disposed on the right linear support;
  providing a right vertical stabilizer coupled to the right linear support;
  providing a left traction propeller disposed at a front end of the left linear support;
  providing a right traction propeller disposed at a front end of the right linear support;
  wherein the left linear support is parallel to the right linear support, and there are no other linear supports;
  changing a thrust ratio of the left and right traction propellers to generate asymmetric thrust to control an active yaw of the UAV.

2. The method according to claim 1, further comprising providing a rudder to control an active yaw of the UAV.

3. The method as recited in claim 1, wherein the UAV does not have any control surfaces.

4. The method as recited in claim 3, wherein the left traction propeller or the right traction propeller is disposed on a same horizontal plane as a longitudinal axis of the left linear support.

5. The method according to claim 1, wherein the UAV comprises of a detachable cargo hold or passenger cabin attached to a bottom side of the UAV.

6. The method as recited in claim 1, wherein the UAV comprises of a microprocessor to change the thrust ratio.

* * * * *